(12) United States Patent
Krajnc et al.

(10) Patent No.: US 12,707,284 B2
(45) Date of Patent: Aug. 11, 2026

(54) CONFIGURATION MODULE FOR CONFIGURING A NETWORK DEVICE OF A RADIOFREQUENCY SENSING NETWORK

(71) Applicant: SIGNIFY HOLDING B.V., Eindhoven (NL)

(72) Inventors: Hugo José Krajnc, Eindhoven (NL); Hendrik Stevens, Waalre (NL); Leendert Teunis Rozendaal, Valkenswaard (NL); Peter Deixler, Arlington, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 451 days.

(21) Appl. No.: 17/928,966

(22) PCT Filed: May 27, 2021

(86) PCT No.: PCT/EP2021/064151
§ 371 (c)(1),
(2) Date: Dec. 1, 2022

(87) PCT Pub. No.: WO2021/244930
PCT Pub. Date: Dec. 9, 2021

(65) Prior Publication Data

US 2023/0232252 A1 Jul. 20, 2023

Related U.S. Application Data

(60) Provisional application No. 63/032,823, filed on Jun. 1, 2020.

(30) Foreign Application Priority Data

Jun. 11, 2020 (EP) .................................... 20179408

(51) Int. Cl.
*H04W 24/02* (2009.01)
*H04W 4/38* (2018.01)
*H04W 64/00* (2009.01)

(52) U.S. Cl.
CPC ............ *H04W 24/02* (2013.01); *H04W 4/38* (2018.02); *H04W 64/003* (2013.01)

(58) Field of Classification Search
None
See application file for complete search history.

(56) References Cited

U.S. PATENT DOCUMENTS

2007/0082677 A1 4/2007 Hart et al.
2013/0072144 A1* 3/2013 Berger ................. H04W 4/029 455/404.1

(Continued)

FOREIGN PATENT DOCUMENTS

CN 111201441 A 5/2020
KR 20080100102 A 11/2008

(Continued)

*Primary Examiner* — Walter J Divito

(57) ABSTRACT

A configuration module for configuring a network device of a radiofrequency sensing network is provided. The control module comprises a network information providing unit for providing network information, wherein the network information includes information indicative of a deviation between a current sensitivity of the sensing network and a desired sensitivity of the sensing network. The control module further comprises an operating variable determining unit for determining an operating variable of the network device based on a predetermined relation between the operating variable of the network device and the sensitivity of the sensing network and on the information indicative of the deviation between the current sensitivity of the sensing network and the desired sensitivity of the sensing network such that the deviation decreases when the network device is configured based on the determined operating variable, (Continued)

and a configuration unit for configuring the network device based on the determined operating variable.

13 Claims, 6 Drawing Sheets

(56) References Cited

U.S. PATENT DOCUMENTS

| | | | |
|---|---|---|---|
| 2016/0040902 | A1 | 2/2016 | Shah |
| 2016/0295357 | A1 | 10/2016 | Grayson et al. |
| 2017/0366938 | A1 | 12/2017 | Wootton et al. |
| 2018/0102858 | A1 | 4/2018 | Tiwari et al. |
| 2018/0143601 | A1 | 5/2018 | Chavan et al. |
| 2019/0383921 | A1 | 12/2019 | Argentieri et al. |
| 2022/0335817 | A1* | 10/2022 | Schober .................. H04L 67/12 |
| 2023/0019044 | A1* | 1/2023 | Bora ....................... H04W 4/80 |
| 2023/0291798 | A1* | 9/2023 | Wang .................... H04L 9/0866 |

FOREIGN PATENT DOCUMENTS

| | | | |
|---|---|---|---|
| WO | 2014177404 | A1 | 11/2014 |
| WO | 2020043592 | A1 | 3/2020 |
| WO | 2020043606 | A1 | 3/2020 |

* cited by examiner 200
201
210
220
220
220
202
203
101
102
103
100
220
204

303
204
203
202
230
240
201
302
311
301

CONFIGURATION MODULE FOR CONFIGURING A NETWORK DEVICE OF A RADIOFREQUENCY SENSING NETWORK

CROSS-REFERENCE TO PRIOR APPLICATIONS

This application is the U.S. National Phase application under 35 U.S.C. § 371 of International Application No. PCT/EP2021/064151, filed on May 27, 2021, which claims the benefit of U.S. Provisional Patent Application No. 63/032,823, filed on Jun. 1, 2020 and European Patent application Ser. No. 20179408.8, filed on Jun. 11, 2020. These applications are hereby incorporated by reference herein.

FIELD OF THE INVENTION

The invention relates to a configuration module, a configuration method and a computer program product for configuring a network device of a radiofrequency sensing network, and to a radiofrequency sensing network comprising at least one network device and a configuration module.

BACKGROUND OF THE INVENTION

Connected light modules communicate with each other, often by exchanging wireless signals, in order to execute functions that extend, or even go beyond, their ordinary function of providing light. For example, the exchanged wireless signals, which are in many cases in the radiofrequency (RF) range, can be used in order to pursue a sensing function which includes multiple mechanisms for collecting information about a presence and/or motion of human beings, particularly about a number of people being present, a person falling, a person making a certain gesture or human breathing taking place, as a result of the impact their bodies have on the exchanged wireless signals. Such a sensing function can usually be integrated into a given hardware architecture easily, since usually no hardware components are required other than those already included in light modules allowing for wireless communication anyway. Hence, a sensing function can usually be implemented on a purely software basis, by only changing the way the wireless signals are transmitted and received using the given hardware and the way the signals are processed to deduce information about a presence and/or motion. This allows for a cost-effective implementation of sensing in already installed light modules.

Implementing a sensing function on wirelessly connected light modules will, in the common situation where the light modules are densely distributed over common professional or residential spaces such as offices, living rooms and bed rooms, etc., create a distributed sensor, i.e. a sensing network. The sensitivity and accuracy of the network will generally rise with increasing density of the network, i.e., for instance, with the amount of light modules located in a given space. This is because the reliability of the signals transmitted and received by the different light modules and the information derived therefrom will generally increase with decreasing distance between the light modules. However, it would be desirable to also improve the sensitivity and accuracy of a sensing network without changing its density, i.e. without adding additional light modules in the part of space in which the sensing function is to be implemented, and also without redistributing already present light modules.

WO 2020/043606A1 discloses a method for controlling a wireless network to perform radiofrequency-based motion detection. Thereto, D1 discloses a controller for controlling a wireless network comprising a plurality of nodes to perform radiofrequency-based motion detection, wherein each unique pair of the plurality of nodes forms a respective node pair and collectively results in a plurality of node pairs, wherein the controller is configured to: select a reference node pair from the plurality of node pairs; obtain at least one reference characteristic of the reference node pair; select a subset of node pairs from the plurality of node pairs, wherein each respective node pair in the subset of node pairs comprises a respective characteristic matching the at least one reference characteristic; perform the radiofrequency-based motion detection with said subset of node pairs.

SUMMARY OF THE INVENTION

It is an object of the present invention to provide a configuration module, a sensing network, a configuration method and a computer program product that allow to increase the sensitivity of the sensing network.

In a first aspect, the present invention relates to a configuration module for configuring a network device of a radiofrequency sensing network. The control module comprises a) a network information providing unit for providing network information, wherein the network information includes information indicative of a deviation between a current sensitivity of the sensing network and a desired sensitivity of the sensing network. The control module further comprises b) an operating variable determining unit for determining an operating variable of the network device based on a predetermined relation between the operating variable of the network device and the sensitivity of the sensing network and on the information indicative of the deviation between the current sensitivity of the sensing network and the desired sensitivity of the sensing network such that the deviation decreases when the network device is configured based on the determined operating variable. Further, the control module comprises c) a configuration unit for configuring the network device based on the determined operating variable.

Since the network information providing unit provides network information including information indicative of a deviation between a current sensitivity of the sensing network and a desired sensitivity of the sensing network, knowledge about a state of the sensing network becomes accessible, in particular knowledge about whether the current sensitivity provided by the sensing network is unsatisfactory, which might be due to an unsatisfactory current sensitivity per se, but also due to, for instance, an unsatisfactory accuracy related to the current sensitivity. Since, furthermore, the operating variable determining unit determines an operating variable of the network device based on a predetermined relation between the operating variable of the network device and the sensitivity of the sensing network and on the information indicative of the deviation between the current sensitivity of the sensing network and the desired sensitivity of the sensing network such that the deviation decreases when the network device is configured based on the determined operating variable, the knowledge about the unsatisfactory sensitivity of the sensing network is complemented with knowledge about how functional properties of the network device influence the sensitivity of the sensing network. This complementary knowledge can be used for choosing how to change the functional properties of the network device in order to change the sensitivity of the sensing network. Since the configuration unit configures the network device based on the determined operating variable, the sensitivity of the sensing network is changed in accordance with the choice made based on the complementary knowledge, so that the sensitivity is changed more efficiently. Since the deviation between the current sensitivity of the sensing network and the desired sensitivity of the sensing network may depend on a context in which sensing is to take place, the sensitivity of the sensing network can be changed in a context-dependent way.

The radiofrequency sensing network comprises at least one network device adapted to transmit and receive radiofrequency signals, i.e. wireless signals constituted by electromagnetic radiation in the radiofrequency range. Preferably, the radiofrequency sensing network comprises at least two, more preferably at least three of such network devices, wherein each of the network devices is adapted to transmit radiofrequency signals to at least one, preferably more, and most preferably all, of the other network devices, and is adapted to receive radiofrequency signals transmitted by at least one, preferably more, and most preferably all, of the other network devices. The sensing network may be understood as a system comprising at least one network device. In case it comprises more than one network device, it may also be understood as a non-local sensor. A network device can be any device having a network device communication unit. A network device communication unit is adapted to receive and transmit wireless signals, particularly radiofrequency signals, and/or wired signals. For instance, the network device communication unit can comprise a network device transceiver for receiving and transmitting radiofrequency signals, or a transmitter for transmitting radiofrequency signals and a receiver for receiving radiofrequency signals. In particular, a network device can be any smart device, i.e. a device comprising a communication unit for receiving and transmitting wireless signals, particularly radiofrequency signals, but which otherwise fulfils the functions of a corresponding conventional device. In particular, such a smart device may be a smart home device, in which case the corresponding conventional function would be that of a conventional home device, like a lamp or a home appliance. In a preferred embodiment, the network device is a smart light module, a smart plug or a smart switch.

The configuration module is adapted to configure one or more network devices of the radiofrequency sensing network. The radiofrequency sensing network can comprise the configuration module and possibly further configuration modules. Each of the one or more configuration modules of the radiofrequency sensing network preferably comprises a configuration module communication unit for communicating with the one or more network devices of the radiofrequency sensing network and, possibly, the other configuration modules. The control module communication unit is adapted to receive and transmit wireless signals, particularly radiofrequency signals, and/or wired signals. For instance, the configuration module communication unit can comprise a configuration module transceiver for receiving and transmitting radiofrequency signals, or a transmitter for transmitting radiofrequency signals and a receiver for receiving radiofrequency signals. Communication between a configuration module and a network device preferably comprises an exchange of wireless or wired signals between the configuration module communication unit and the network device communication unit. In some embodiments, one or more of the network devices may comprise the configuration module configuring them. For instance, each network device may comprise a configuration module configuring the respective network device. If a network device comprises a configuration module configuring the network device, the network device communication unit and the configuration module communication unit may be a single unit.

The configuration module may also be located in the cloud, such as on one or more servers, for instance. In that case, the configuration module communication unit may comprise means via which a user of the network device is connected to the cloud, such as, for instance, a router via which he/she is connected to the internet.

The network information providing unit is adapted to provide network information, wherein the network information includes information indicative of a deviation between a current sensitivity of the sensing network and a desired sensitivity of the sensing network. The network information providing unit can be, for instance, a storage unit storing the information about the radiofrequency sensing network, or it can be connected to a storage unit storing the information about the radiofrequency sensing network. The network information providing unit can also be connected to an input providing unit, such as a user interface via which a user can directly input the network information. Also, the network information providing unit may have access to the configuration module communication unit, wherein the signals received by the configuration module communication unit, possibly provided by a user, may comprise the network information, wherein the network information providing unit may be adapted to retrieve the network information by accessing the configuration module communication unit.

Network information refers to information about the radiofrequency sensing network as a whole and/or its constituents, such as the one or more network devices. It is not limited to information indicative of a deviation between a current sensitivity of the sensing network and a desired sensitivity of the sensing network.

Sensitivity is understood herein as referring to a probability that a sensing target is correctly sensed, for instance, to the ratio of the number of true positives to the sum of the number of true positives and the number of false negatives in a predetermined evaluation time. Sensitivity may also be understood as referring to a classification threshold, wherein the classification threshold may be defined as an intensity of a signal above which the signal is classified as indicating a positive sensing results, such as a presence, for instance, and below which the signal is classified as indicating a negative sensing result, such as an absence, for instance. For instance, the sensitivity may indicate a range of values the classification threshold can take. The sensing target can be a presence or particular motion of a human being or another object to be sensed, in particular a number of people being present, a person falling, a person making a certain gesture or human breathing taking place.

Sensitivity may also be understood as being indicative of a latency in sensing a sensing target, i.e., for instance, of a time it takes to sense a sensing target. This might particularly be the case if the sensing target causes a change in signal intensity and if a positive sensing result is only concluded when the change has become sufficiently large and/or when the change has persisted for a predetermined period of time. The predetermined period of time may be sufficiently long so as to exclude random peaks in signal intensity from causing a positive sensing result.

The current sensitivity of the sensing network refers to a sensitivity that can currently be associated with the sensing network. For instance, it may be a sensitivity deduced from sensing results over a predetermined time in the past or from a predefined calibration procedure.

The desired sensitivity may refer to a degree of sensitivity desired by a user of the sensing network. It may therefore be understood subjectively. However, the desired sensitivity may also be defined objectively. For instance, the desired sensitivity may refer to a degree of sensitivity that is as high as possible without leading to an unacceptably low degree of specificity. Specificity refers to a probability that the absence of a sensing target is correctly identified by the sensing network, for instance, to the ratio of the number of true negatives to the sum of the number of true negatives and the number of false positives in a predetermined evaluation time. The subjective and the objective understanding of the desired sensitivity may coincide in some cases. The desired sensitivity of the sensing network may also be related to a desired accuracy of the sensing network. Accuracy refers to a probability that a sensing result is correct, for instance, to the ratio of the sum of the number of true positives and true negatives to the sum of the number of actual positives and actual negatives.

The deviation between the current sensitivity of the sensing network and the desired sensitivity of the sensing network may, for example, be the difference between the two. The information indicative of the deviation between the current sensitivity of the sensing network and the desired sensitivity of the sensing network may, for example, be an indication of that difference, or simply an indication of the presence of a nonzero difference. For instance, the information indicative of the deviation between the current sensitivity of the sensing network and the desired sensitivity of the sensing network may indicate an unacceptably low sensitivity. More generally, the information indicative of the deviation between the current sensitivity of the sensing network and the desired sensitivity of the sensing network may indicate that a sensing performance of the sensing network is unsatisfactory for a user. The information indicative of the deviation between the current sensitivity of the sensing network and the desired sensitivity of the sensing network may be extracted from a signal initiated by a user, such as, for instance, via a user interface and/or a terminal device.

The operating variable determining unit is adapted to determine an operating variable of the network device based on a predetermined relation between the operating variable of the network device and the sensitivity of the sensing network and on the information indicative of the deviation between the current sensitivity of the sensing network and the desired sensitivity of the sensing network such that the deviation decreases when the network device is configured based on the determined operating variable. The operating variable of the network device refers to a parameter used for processing radiofrequency signals received by the network device or to a setting based on which the network device receives and/or transmits radiofrequency signals. The relation between the operating variable of the network device and the sensitivity of the sensing network may refer to a functional relationship, particularly a functional dependence of the sensitivity of the sensing network from the operating variable of the network device, to a numerical association, possibly stored in the form of a table, or simply to a qualitative relation. A qualitative relation may have one of the following exemplary forms: a) if operating variable x increases, the sensitivity increases as well, b) if operating variable y increases, the sensitivity decreases, c) if operating variable z increases, the sensitivity increases as well as long as the operating variable does not exceed a threshold t. In any case, the operating variable determining unit will therefore have sufficient knowledge in order to deduce how the operating variable needs to be changed in order to effect a decreasing deviation between the current sensitivity of the sensing network and the desired sensitivity of the sensing network when the network device is configured based on the changed operating variable. For instance, if the relation between the operating variable of the network device and the sensitivity of the sensing network indicates that the sensitivity of the sensing network increases if the operating variable increases, then the operating variable determining unit will, upon receiving the information indicative of the deviation between the current sensitivity of the sensing network and the desired sensitivity of the sensing network, determine that the operating variable needs to be increased if the current sensitivity of the sensing network is lower than the desired sensitivity of the sensing network.

The configuration unit is adapted to configure the network device based on the determined operating variable. Configuring the network device based on the determined operating variable actually implements the change in operation of the network device that is implied by the changed operating variable.

In a preferred embodiment, the sensitivity of the sensing network and the relation between the operating variable of the network device and the sensitivity of the sensing network are space-dependent, wherein the deviation between the current sensitivity of the sensing network and the desired sensitivity of the sensing network is a deviation in a region of space, and wherein the operating variable determining unit is adapted to determine the operating variable further based on the relation between the operating variable of the network device and the sensitivity of the sensing network in the region of space. This has the effect that a more efficient sensing can be achieved by the sensing network even in geometrically complex spatial environments. It also has the effect that efficient sensing can be performed by the sensing network independent from any other use of the network devices that dictates their placement. For instance, in the case of a set of smart light modules, the position of the individual modules may be dictated by their use for providing light. However, the so dictated positions may not be optimal for sensing, since sensing results might need to be acquired in regions of space where no light, no direct light or only little light is needed and where, therefore, none of the modules may be positioned.

The space-dependency of the sensitivity of the sensing network is ultimately caused, at least to a considerable degree, by the non-uniformity of any radiation generated by a network device, and therefore also of the radiofrequency signals transmitted by a network device. The intensity of the radiation generated by a network device falls off rapidly with increasing distance from the network device, and if the intensity falls below a predetermined lower sensing threshold, information regarding the impact of objects on the radiation will no longer be extractable from the radiation. The lower sensing threshold may be defined as an intensity of a signal below which no sufficiently accurate sensing result, or no sensing result at all, can be derived from the signal. The lower sensing threshold may, for instance, correspond to a noise intensity, i.e., for instance, to an average amount of background noise received with signals. In this case, if the noise is too intense as compared to an intensity of a signal, the signal is not distinguishable from the noise and no meaningful sensing result can be extracted from it. Moreover, if the intensity of radiation carrying a signal further falls below a predetermined reception threshold, the radiation itself will even no longer be measurable. The reception threshold may be defined as an intensity of a signal below which the signal will no longer be received by the network device. In fact, the intensity of a signal may not only be too low for sensing, but it may also be too high for sensing. This may be the case if the intensity rises above a predetermined upper sensing threshold, which can happen, for instance, if the receiving and the transmitting network device are located too close to each other. The upper sensing threshold may be defined as an intensity of a signal above which no sufficiently accurate sensing result, or no sensing result at all, can be derived from the signal. The upper sensing threshold may, for instance, correspond to a maximum signal intensity receivable by a network device. An upper sensing threshold and a lower sensing threshold may, together, form a sensing window, wherein no sensing with a sufficiently high accuracy, or no sensing at all, is possible based on signals with intensities outside of the sensing window, i.e. being either above the upper sensing threshold or below the lower sensing threshold. If, now, the network devices are not distributed in space densely enough, or locally too dense, the intensity of the radiation exchanged between them for performing the sensing function of the sensing network will fall outside the sensing window at different locations in space. And even if the network devices are distributed at least densely enough in a certain part of space, outside of the boundaries of that part of space the intensity of the radiation will still at some point fall below the sensing threshold and thereby outside the sensing window, and even, eventually, below the reception threshold. In fact, the sensitivity of the sensing network will spatially vary with the intensity of the radiation. Often, the sensitivity will increase with the intensity of the radiation. Of course, the space-dependency of the sensitivity of the sensing network will generally become relatively complex as soon as obstacles, such as furniture of a room, are present.

Additionally or alternatively to being space-dependent, the sensitivity of the sensing network and/or the relation between the operating variable of the network device and the sensitivity of the sensing network may depend on environmental conditions. The sensitivity of the sensing network and/or the relation between the operating variable of the network device and the sensitivity of the sensing network may then each have a static and a dynamic component, wherein the static component may be independent from environmental conditions and the dynamic component may be dependent on environmental conditions.

In particular, the space-dependency of the sensitivity of the sensing network and/or of the relation between the operating variable of the network device and the sensitivity of the sensing network may be dependent on environmental conditions. This is because, for instance, an attenuation of signals transmitted by a network device located outside may depend on an amount or type of hydrometeors present, such as rain, clouds, fog and/or snow, for example, and/or on a humidity of the ambient air, which may be caused, for instance, by a wet floor of a kitchen. The degree of dependence may itself depend, for instance, on a frequency of the signals transmitted. For example, the attenuation of transmitted signals due to hydrometeors being present may increase with increasing frequency of the signals. This may, at least in part, be caused by an increase in scattering effects for higher frequencies. While hydrometeors being present may generally increase the attenuation of signals, humid air may generally decrease the attenuation of signals, i.e. positively correlate with transmission characteristics.

The space-dependency of the relation between the operating variable of the network device and the sensitivity of the sensing network is mainly caused by the fact that configuring the network device based on differently determined operating variables, i.e. different values or choices therefor, will not have the same effect on the sensitivity of the sensing network throughout the whole space, in particular not even throughout a relevant sensing area where the intensity of the radiation exchange between network devices is above the sensing threshold, in particular inside a sensing window. Relatedly, of course, the relation between the operating variable of the network device and the sensitivity of the sensing network is also space-dependent simply because the network device is located at a distinguished position in space. For instance, it can be easily understood that changing the manner of operating in a network device in, say, a corner of the room will usually not have as high of an effect on the sensitivity in an opposite corner of the room as if a network device whose manner of operation were changed would be located in the center of the room.

The space-dependency of the sensitivity of the sensing network may be indicated by a sensing region. In that case, the space-dependency of the relation between the operating variable of the network device and the sensitivity of the sensing network may be indicated by a change in the sensing region in response to a change in the operating variable. The sensing region, which is a region in space, may be understood as an indication of the sensitivity of the sensing network, wherein the boundary of the sensing region may indicate where the sensitivity of the sensing network falls—seen from the inside of the sensing region towards its outside—outside the sensing window.

The deviation between the current sensitivity of the sensing network and the desired sensitivity of the sensing network can be a deviation in a region of space, so that the information indicative of the deviation, which is provided by the network information providing unit, can be understood as information relating exclusively, or at least predominantly, to that region of space. For instance, the region of space may be a part of the room in which a user has lately noticed a number of times in a given period of time that the event of someone entering the room has not been sensed by the sensing network, wherein the user might desire that this number decreases in the future.

Determining the operating variable based on the relation between the operating variable of the network device and the sensitivity of the sensing network in the region of space may imply that the operating variable determining unit is adapted to take into account information about how different settings of the operating variable influence the sensitivity of the sensing network in the region of space, wherein a given setting of the operating variable might only be considered for implementation if its effect is such that the sensitivity in the region of space can approach the desired sensitivity if the network device is configured based on the given setting. In case the sensitivity of the sensing network and/or the relation between the operating variable of the network device and the sensitivity of the sensing network depend on environmental conditions, the operating variable determining unit may also be adapted to take into account the environmental conditions for determining the operating variable, wherein information about the environmental conditions may be provided by the network information providing unit.

In a preferred embodiment, determining the operating variable involves determining a degree of modification for a radiofrequency signal received by the network device, the modification comprising an amplification and/or attenuation, wherein the network device is being configured by the configuration unit such that it executes a sensing function in the sensing network based on a modified signal, wherein the modified signal is determined by a radiofrequency signal received by the network device and the degree of modification. This has the effect that sensing becomes more efficient even though the intensity of radiation exchanged in the sensing network is not physically changed.

The degree of modification for the radiofrequency signal received by the network device may refer to a shift by which a value of the received radiofrequency signal is shifted, wherein the shift may be positive or negative, and/or it may refer to a factor by which the value of the received radiofrequency signal is multiplied. Moreover, also a combination of the two ways of modifying the radiofrequency signal received by the network device may be implemented, wherein then the signal received by the network device would be transformed according to a linear relationship.

Preferably, the radiofrequency signal received by the network device is a signal in time comprising a value for each point in time recorded, in which case the modification would preferably apply to each value in time. However, it is also possible that the modification may be time-dependent. It is also understood that the modification may be more complex, i.e. comprise a functional form different from the linear form. In particular, the modification does not necessarily comprise an amplification and/or attenuation.

In fact, the degree of modification may also refer to a filter applied to the signal. This is to say that determining the operating variable may, additionally or alternatively, involve determining a degree of modification for a radiofrequency signal received by the network device, wherein the modification refers to a filter. The filter may be given by any of various functional forms.

The modification may also be applied to only a part of a signal, i.e., for instance, only temporarily. Likewise, the modification may be applied to only every n-th signal received, wherein n may be any predefined integer.

The signal received by the network device may also comprise a plurality of components, i.e., for instance, a plurality of values for each point in time. In this case, a different degree of modification may be determined for different components, and/or a degree of modification may only be determined for selected components. For example, the signal may comprise channel state information (CSI) with, in the exemplary case of the Wi-Fi standard, 64, 128, 256 or a different number of complex-valued components, wherein a degree of modification may be determined for each of the components, and possibly a different one for the respective real and imaginary part of the components.

Preferably, the signals, in particular the modified signals, are processed further, and/or analyzed, for sensing. For instance, the sensing network may further comprise an analysis module for further processing and/or analyzing the signals, preferably the modified signals, received by one or more network devices of the sensing network in order to arrive at a sensing result.

In a preferred embodiment, the degree of modification is defined relative to an average value of radiofrequency signals received by the network device.

The average value may correspond to an average intensity of radiofrequency signals received by the network device during a calibration process initiated by a user, or it may correspond to an average intensity of signals received by the network device, or a different network device, over a time window in the past, wherein that time window may be determined such that it matches a current time with respect to the time of day, the number of users at home, etc. The average value may also be an average intensity of radiofrequency signals received by the network device over one or more time windows in the past during which the network devices of the radiofrequency sensing network were arranged similarly, i.e. during which the radiofrequency sensing network had a similar spatial layout of network devices. In that case, only radiofrequency signals received from certain types of other network devices may be considered for determining the average value. In some embodiments, the average value may be determined from an average intensity of radiofrequency signals received by a plurality of network devices of the radiofrequency sensing network. For instance, the average value may in that case be determined from an average intensity of radiofrequency signals received by network devices that were arranged in a similar layout, regardless of the type of network device. That is to say, the average value may be determined from an average intensity of radiofrequency signals received by network devices in a sensing network located in the same or a similar way relative to other network devices of the sensing network. The average value may also be determined from known signal interferences, such as, for instance, interferences of signals transmitted by network devices located in adjacent rooms of a house. The known interferences may be known or estimated based on information relating to the material of the walls between the adjacent rooms, such as brick or wood, wherein the wall material may be determined based on the geographic location. For instance, in German houses the walls will typically comprise brick, whereas the walls in North American houses will more often comprise wood, which even holds for walls within the houses and structural walls. Generally, the average value may be determined from time windows during which no human was present as determined by the radiofrequency sensing network or as indicated by a user, or it may be determined from time windows during which a presence of a human or a plurality of humans was sensed by the radiofrequency sensing network or indicated by a user.

If the degree of modification is defined relative to an average value of radiofrequency signals received by the network device, an intensity of the modified signal may be given by $I'=A+\alpha\cdot(I-A)$, wherein I refers to an intensity of the signal received by the network device, A refers to the average value of radiofrequency signals received by the network device, I' refers to the intensity of the modified radiofrequency signal, and $\alpha$ refers to the degree of modification.

Alternatively, the intensity of the modified signal may be given by $I'=(1+\tilde{\alpha})\cdot I$ if $I>A$ and by $I'=(1-\tilde{\alpha})\cdot I$ if $I<A$, wherein, in this case, $\tilde{\alpha}$ refers to the degree of modification.

In a preferred embodiment, the degree of modification for the radiofrequency signal received by the network device depends on an intensity of the received radiofrequency signal itself. This has the effect that an asymmetric modification of the signal with respect to an average value may be achieved, which is of particular advantage for distinguishing between sensing objects by their transmission and absorption characteristics.

For example, the degree of modification, which may be defined relative to an average value of radiofrequency signals received by the network device, may further depend on whether the intensity of the received radiofrequency signal lies above or below the average value. In particular, the intensity of the modified signal may be given by $I'=A+\alpha_{+}\cdot(I-A)$ if $I>A$ and by $I'=A+\alpha_{-}\cdot(I-A)$ if $I<A$, wherein I refers to the intensity of the received radiofrequency signal, A refers to the average value of radiofrequency signals received by the network device, I' refers to the intensity of the modified radiofrequency signal, and $\alpha_{+}$ and $\alpha_{-}$ refer to the degree of modification for the radiofrequency signal received by the network device if the intensity of the received radiofrequency signal is above or below the average value, respectively. In this case, the degree of modification depends on the intensity of the received radiofrequency signal itself via its value I as compared to the average value A. However, more general forms of the dependency of the degree of modification for the radiofrequency signal received by the network device from the intensity of the received radiofrequency signal itself are possible. For example, in the formulae given above, $\alpha_+$ and $\alpha_-$ may itself be a function of I, i.e. contain a linear, quadratic or cubic term in I, for example.

Alternatively, the intensity of the modified signal may be given by $I'=(1+\tilde{\alpha}_+)\cdot I$ if $I>A$ and by $I'=(1-\tilde{\alpha}_-)\cdot I$ if $I<A$, wherein, in this case, $\tilde{\alpha}_+$ and $\tilde{\alpha}_-$ refer to the degree of modification. Like $\alpha_+$ and $\alpha_-$, also $\tilde{\alpha}_+$ and $\tilde{\alpha}_-$ may not only be constants, but potentially a function of I, i.e. contain a linear, quadratic or cubic term in I, for example.

Generally, asymmetric modifications of the intensity of the received radiofrequency signals lead to an improved motion sensing. This is because motion targets, such as a human body, typically absorb radiofrequency radiation to a higher degree than they reflect it, such that their predominant effect on the received radiofrequency signals is that the intensity of the received radiofrequency signals is decreased. Therefore, motion sensing is improved by making drops in the received radiofrequency signal intensity more visible, whereas amplifying spikes in intensity may be less meaningful or even induce false positives. In fact, an asymmetric modification of the received radiofrequency signals may generally lead to an improved sensing of specific types of sensing targets. In particular, if the sensing target is predominantly reflective for radiofrequency radiation, spikes in the received radiofrequency signal may be amplified, while dips may be suppressed.

In a preferred embodiment, the radiofrequency network comprises further network devices, wherein the degree of modification for the radiofrequency signal received by the network device depends on which of the further network devices has transmitted the radiofrequency signal and/or on a state of the further network device which has transmitted the radiofrequency signal. This has the effect that the sensitivity of the sensing network can be fine-tuned in space.

For example, if the deviation between the current sensitivity of the sensing network and the desired sensitivity of the sensing network indicated by the network information is above a predetermined tolerance only in a region of space between the network device and a certain further network device of the radiofrequency sensing network, the degree of modification for only those radiofrequency signals received by the network device from that further network device may be determined, while the degree of modification for radiofrequency signals received by the network device from other network devices of the radiofrequency sensing network may stay the same. It is also possible that the degree of modification for radiofrequency signals received by the network device from every other network device of the radiofrequency sensing network may be determined based on the state of the respective further network device which has transmitted the respective radiofrequency signal, wherein the state of the respective further network device may comprise operational characteristics such as the temperature of the respective network device. This leads to an improved and more efficient sensing, since the temperature of the respective further network device will affect the transmission properties of that further network device, such as the transmission or carrier frequency at which it transmits radiofrequency signals. In this way, for example, a possible loss in received signal intensity due to a shift in transmission or carrier frequency may be compensated for by determining an appropriate degree of modification. This is particularly beneficial because different carrier frequencies are generally shifted differently depending on the temperature of the network device. The temperature of the network device may also be a temperature of its parts, such as, for instance, a temperature of an electronic circuit board included in the network device.

In a preferred embodiment, determining the operating variable involves determining a rate at which the network device transmits radiofrequency signals. If the radiofrequency sensing network comprises further network devices, it is preferred that a rate at which the further network devices transmit radiofrequency signals is determined additionally or alternatively. This has the effect that the sensitivity of the radiofrequency sensing network is increased due to an increased amount of data collectible by the network devices in a given amount of time. This is particularly advantageous for resolving quick movements, or generally to increase the speed of sensing by decreasing a sensing latency.

In a preferred embodiment, the network device has multiple sensing channels and determining the operating variable involves determining one or more of the sensing channels to be used for receiving and/or transmitting signals, and/or wherein determining the operating variable involves determining a carrier frequency to be used for receiving and/or transmitting signals. In particular, the sensing channel and/or the carrier frequency to be used for receiving and/or transmitting signals may be determined such that reception and/or transmission, respectively, takes place at frequencies slightly offset, implying that the intensity of the received radiofrequency signals is effectively reduced. For example, if the network device is configured to receive radiofrequency signals from a further network device of the radiofrequency sensing network at a carrier frequency $f_0$, wherein the network information indicates that a non-tolerable amount of false positives has been determined by the radiofrequency sensing network in a spatial region between the network device and the further network device, the nominal carrier frequency to be used for receiving signals from the further network device by the network device may be determined to be slightly offset from $f_0$, such that the effective intensity of radiofrequency signals received from the further network device by the network device is reduced, which leads to a decrease of false positives in the spatial region between the two network devices as well. This may be seen as an alternative to determining the degree of modification such that the intensity of the modified radiofrequency signal is decreased.

In an exemplary embodiment, the operating variable is a carrier frequency to be used for receiving and/or transmitting signals, and the operating variable determining unit is adapted to determine that the carrier frequency is to be changed after every n-th signal transmitted, wherein n may be any predetermined integer.

In an exemplary embodiment, the operating variable determining unit is adapted to determine that the carrier frequency used for transmitting signals is to be changed by a predetermined amount, i.e., for instance, shifted by a predetermined shift and/or multiplied by a predetermined factor. Since other network devices of the sensing network associate signals transmitted by the network device with a fixed carrier frequency, i.e. a carrier frequency fixed for the respective communication link, a mismatch between expected and actual carrier frequency occurs, leading to an effectively decreased intensity of the received signals. Additionally or alternatively, the operating variable determining unit is adapted to determine that the carrier frequency used for receiving signals is to be changed by a predetermined amount, i.e., for instance, shifted by a predetermined shift and/or multiplied by predetermined factor. This has a similar effect, namely a mismatch between expected and actual carrier frequency for signals received from the other network devices, leading to an effective decrease in their intensity.

Preferably, the change in carrier frequency is relatively small, i.e. small enough to not cause a loss of signaling connection. Moreover, the carrier frequency is preferably determined such that no impact is made on any processing of the received signals, in particular such that any information carried by the signals is still communicated and/or can still be decoded.

Preferably, if the network information provided by the network information providing unit includes information that the sensitivity of the sensing network is desired to be increased, the carrier frequency is determined to be changed only if the operating variable determining unit has already determined all other operating variables, in particular if it has determined that changing any other operating variable will not increase the sensitivity of the sensing network. This is because changes in carrier frequency will often only lead to reductions in sensitivity.

In a preferred embodiment, the network information further includes information indicative of a sensing load on the sensing network, wherein the operating variable determining unit is adapted to determine the operating variable further based on the information indicative of the sensing load. This has the effect that the sensitivity of the sensing network may be adapted to a bandwidth required by one or more network devices of the radiofrequency sensing network for other functions than sensing.

A sensing load refers to an amount of radiofrequency signals used for performing sensing in a given amount of time. For example, if the network information indicates that the sensing load on a particular network device or on the radiofrequency sensing network as a whole is above a predetermined load threshold, the transmission rate of certain network devices may be decreased while at the same time choosing a degree of modification for radiofrequency signals received from those network devices which partially compensates for the decreased transmission rate.

In an exemplary embodiment, the network information further includes information indicative of a signaling characteristic between the network device and another network device of the sensing network, wherein the operating variable determining unit is adapted to determine the operating variable further based on the information indicative of the signaling characteristic. The information indicative of the signaling characteristic may be provided in terms of channel state information (CSI), and/or the signaling characteristic may refer to a transmission quality of signals transmitted by the network device and received by the other network device and/or to a reception quality of signals received by the network and transmitted by the other network device.

Determining the operating variable may involve determining a setting based on which a choice of using a particular antenna and/or a particular set of antennas of the network device for transmitting and/or receiving signals is made, if the network device comprises more than one antenna for receiving and/or transmitting signals. For instance, the information indicative of a signaling characteristic may be provided for each of the antennas, and the operating variable determining unit may be adapted to compare the signaling characteristics indicated for each of the antennas with each other and determine a setting such that an antenna and/or a set of antennas in accordance with the result of the comparison is used for sensing and/or transmitting signals. For instance, the operating variable determining unit may be adapted to determine that antenna and/or that set of antennas to be used for receiving and/or transmitting signals with which the highest or lowest reception quality is associated according to the information provided by the network information providing unit. Differences in signaling characteristics between antennas may arise from differences in design, calibration and/or from ongoing receptions and/or transmissions due, for instance, to ongoing sensing. Choosing a particular set of antennas to be used for transmitting and/or receiving signals might be preferred, for instance, in case the network devices of the radiofrequency sensing network communicate with each other using multiple-input and multiple-output (MIMO) techniques. In such MIMO applications, it might, additionally or alternatively, be preferred to change the manner how signals exchanged by the network devices are processed. In particular, it might be preferred to change the processing of signals in accordance with a choice of a set of antennas to be used for transmitting and/or receiving signals.

In the same or another exemplary embodiment, determining the operating variable may further involve determining a change in the signaling characteristic indicated by the information provided by the network information providing unit. For instance, the operating variable determining unit may be adapted to determine that a value of a parameter included in channel state information provided by the network information providing unit is to be changed based the channel state information and/or other network information provided by the network information providing unit.

Hence, in some embodiments, determining the operating variable involves determining hardware parameters relating to a transmission and/or reception of radio frequency signals by the network device. The operating variable determining unit is therefore not limited to determining software parameters, i.e. those parameters which are used for processing the radio frequency signals received by the network device in order to arrive at a sensing result.

In fact, determining the operating variable may even involve determining that a temperature of the network device is to be changed, preferably according to a predefined prescription. Changing the temperature will generally lead to changes in reception and/or transmission properties of the network devices, such as, for example, by changing physical properties of a radio or an antenna of the network device. Temperature changes may even influence timing, through changing physical properties of a clock of the network device. Although usually temperature effects are already compensated for by standard communication protocols, they could also be used to intentionally modify the intensity of signals. Conversely, therefore, the operating variable may also be an operating variable that could be set to a compensating value in order to compensate for a temperature change of the network device, wherein determining the operating variable may involve determining that the operating variable is not to be set to the compensating value but, for instance, to a value slightly off-set from the compensating value. In this way, standard temperature compensation measures might be partially or completely cancelled in order to achieve the intentional modification of signal intensity.

In a further exemplary embodiment, determining the operating variable may involve determining a directionality according to which the network device is to transmit radiofrequency signals. For instance, if the network device is adapted to transmit the signals predominantly in a certain direction, which might be the case if it supports beam steering or forming by virtue of a suitable antenna or radio and corresponding control means, then the operating variable may be that direction. Consequently, the sensing region and thereby the sensitivity of the sensing network will be changed according to the changed direction in which the network device will then predominantly transmit signals. For instance, if the network device has so far been transmitting signals in a first direction, wherein another network device is located in a different, second direction from the network device, then changing the directionality such that signals are transmitted in the second direction will generally lead to an increased sensitivity near the other network device. Also, it might be preferred that determining the operating variable involves determining that the network device is to transmit signals predominantly in a direction of the center of a room in which the network device is located, in particular away from any walls of the room that have a distance to the network device below a predefined threshold. If, like in this case, determining the operating variable involves determining a directionality according to which the network device is to transmit radiofrequency signals, the network information provided by the network information providing unit may further include information indicative of a number of antennas of the network device, the locations the network device and/or other network devices of the sensing network, and/or other properties of the network device.

In another exemplary embodiment, the network device may be adapted to distinguish between signal paths, and determining the operating variable may involve determining a signal path selection criterion. A signal path selection criterion refers to a criterion for selecting a path from a set of paths that a signal transmitted by another network device has taken. The set of paths refers to the plurality of paths along which parts of a signal, i.e. the same signal but with a part of its intensity, take due to non-unidirectionality, i.e. non-perfect beam collimation, signal splitting at object surfaces due to reflection, transmission, absorption characteristics and scattering characteristics of the surfaces. In particular, the signal path selection criterion may be such that that part of a given signal will be selected, i.e., for instance, for further processing, which has taken a path that does not correspond to the line of sight between the network device and the network device which has transmitted the signal. For instance, the signal path selection criterion may be such that that part of a given signal will be selected, i.e., for instance, for further processing, which is highest in intensity or which is most stable in time. The signal path selection criterion may, additionally or alternatively, also be determined based on user feedback, wherein the user feedback may indicate that the determined criterion is such that the sensitivity of the sensing network has changed towards the desired sensitivity.

In a preferred embodiment, the network information further includes information indicative of a sensing mode, a sensing need of the sensing network, a predetermined power consumption level of the network device and/or a predetermined radiation tolerance, wherein the operating variable determining unit is adapted to determine the operating variable further based on the information indicative of the sensing mode, the sensing need of the sensing network, the predetermined power consumption level of the network device and/or the predetermined radiation tolerance. This leads to the ability to achieve an even more context-dependent sensitivity of the sensing network.

The sensing mode refers to a meaning of true positives or a purpose of the sensing. For instance, the sensing mode may be presence sensing, people counting, motion sensing, occupancy sensing, gesture detection, fall detection or breathing detection. The sensing need refers to a relevance of sensitivity in a particular part of space and in a particular window in time. It may be preferred that one sensing need is defined for each sensing mode. For instance, the need for accurate breathing detection in a room where a baby is sleeping may generally be maximal, whereas if it has been detected that an adult has entered the room, the sensing need for accurate breathing detection in that room may be decreased. The predetermined power consumption level of the sensing level may refer, for instance, to a level of power consumption maintained by the network device during standby. For instance, the operating variable may be determined such that the network device, during standby, has a power consumption below or equal to the predetermined level. The predetermined radiation threshold refers to a configurable threshold value for the intensity of the radiofrequency signals exchanged in the radiofrequency sensing network. The radiation threshold may be dependent on a user input, i.e. be user-dependent. In this case, the degree of modification would be dependent on a user to be sensed. Additionally or alternatively, the radiation threshold may be dependent on a signaling standard employed by the sensing network, and/or on a frequency of the signals exchanged by the network devices of the sensing network. The radiation threshold may also depend on a type of the network device. For instance, if the network device is a smart reading lamp, it is likely that a user's head is located close to the lamp frequently, so that the radiation threshold may be relatively low, i.e., for instance, low as compared to a network device being a smart light bulb of a light module mounted to the ceiling of a room.

In an exemplary embodiment, the operating variable determining unit is adapted to determine the degree of modification for radiofrequency signals received by the network device depending on the sensing mode of the sensing network. For instance, the degree of modification may be a degree of amplification, wherein the degree of amplification in a presence and/or motion sensing mode may be higher than in a breathing detection mode and/or in a people counting mode.

In a preferred embodiment, the network information further includes information indicative of a location of the network device, wherein the operating variable determining unit is adapted to determine the operating variable further based on the information indicative of the location of the network device. This further improves contextual sensitivity improvement of the radiofrequency sensing network. For example, the importance of a high sensitivity of the sensing network may vary in space over time, wherein this variation may be accounted for by determining the operating variable of network devices further depending on the location of the network device.

The information indicative of the location of the network device may be provided based on a user input, such as via an application on a terminal device like a smartphone, for instance. Also, the information indicative of the location of the network device may be provided based on a type of the network device. The type of the network device may, for instance, refer to a product identifier or a product class, i.e., for instance, to whether the network device is a ceiling light, a standing light, or a light spot. The type of the network device may correlate with a location at which the network device is typically arranged. For instance, a ceiling light is typically arranged in the middle of a room, while a standing light is typically arranged closer to a wall or at least out of walking paths. Light spots will typically be mounted to a wall or the ceiling of a room, wherein the type of the network device may distinguish between those light spots typically mounted to a wall and those light spots typically mounted to the ceiling. Hence, the type of the network device may be such that it allows to deduce an expectable location of the network device. Moreover, the information indicative of the location of the network device may also be provided based on an intensity of radiofrequency signals received by other network. For instance, the network information providing unit may be adapted to reconstruct a map of an environment of the sensing network, i.e., for instance, of the room or office in which the sensing network is installed, based on the intensity of the received radiofrequency signals. As long as this map is too coarse in order to deduce from it a location of the network device with sufficient certainty, it might be preferred to combine the information deduced from it with information indicative of the location of the network device provided otherwise, such as, for instance, with information provided based on a user input or on a type of the network device.

The location of the network device may refer to coordinates of the network device in a coordinate system provided for the sensing network, and/or it may refer to a distance of the network device to objects in or bounding an area in which sensing by the sensing network is to take place. The information indicative of the location of the network device may also refer to a proximity of the network device to an object in or bounding an area in which sensing by the sensing network is to take place, wherein the proximity may be judged by a user. The information indicative of the location of the network device may also refer to a lack of any proximity of an object in or bounding an area in which sensing by the sensing network is to take place, wherein also this lack of proximity may be judged by the user. Such a lack of proximity may imply that the network device is located substantially freely, i.e. without any substantial obstruction surrounding it. If, for instance, an object like a wall or a particular wall configuration like a corner is in the proximity of the network device, the operating variable will be determined differently than if no proximity of a wall or particular wall configuration to the network device has been indicated.

In a preferred embodiment, the network information further includes information indicative of a sensing result and a sensing need depending on the sensing result, wherein the operating variable determining unit is adapted to determine the operating variable further based on the information indicative of the sensing result and the sensing need depending on the sensing result. For instance, if a room is empty as determined by the radiofrequency sensing network located in the room, the sensing need may be localized, i.e. be highest, in a region close to the door of the room, whereas if the room becomes populated, which is determined by positive sensing results in the region close to the door, the sensing need may spatially grow, possibly towards the whole room. In an alternative example, a sensing result may be a false positive of from a sensing network. The false positive may be notified to or observed by a user. The sensing need or in other words the sensing requirements may also be predetermined by the user or by the radiofrequency sensing system.

In a second aspect of the present invention, a radiofrequency sensing network is provided which comprises a) at least one network device for receiving and transmitting radiofrequency signals and b) a configuration module according to the first aspect for configuring the at least one network device. The radiofrequency sensing network may also be understood as a radiofrequency sensing system. Preferably, the radiofrequency sensing network comprises multiple, in particular at least three, network devices for receiving and transmitting radiofrequency sensing signals. In cases where the configuration module is not part of, integrated in or comprised by any of the network devices, the radiofrequency sensing network could alternatively be understood as not comprising the configuration module.

In a third aspect, the present invention relates to a method for configuring a network device of a radiofrequency sensing network. The configuration method comprises a step of a) providing network information, wherein the network information includes information indicative of a deviation between a current sensitivity of the sensing network and a desired sensitivity of the sensing network. The configuration method further comprises a step of b) determining an operating variable of the network device based on a predetermined relation between the operating variable of the network device and the sensitivity of the sensing network and on the information indicative of the deviation between the current sensitivity of the sensing network and the desired sensitivity of the sensing network such that the deviation decreases when the network device is configured based on the determined operating variable. Further, the configuration method comprises a step of c) configuring the network device based on the determined operating variable.

In a fourth aspect, the present invention relates to a computer program product for configuring a network device of a radiofrequency sensing network according to the second aspect, the computer program product comprising program code means causing a configuration module according to the first aspect to execute a configuration method according to the third aspect.

It shall be understood that the configuration module, the radiofrequency sensing network, the configuration method, and the computer program product have similar and/or identical preferred embodiments, in particular, as defined in the dependent claims.

It shall be understood that a preferred embodiment of the present invention can also be any combination of the dependent claims or above embodiments with the respective independent claim.

These and other aspects of the present invention will be apparent from and elucidated with reference to the embodiments described hereinafter.

DETAILED DESCRIPTION OF EMBODIMENTS

Figure 1:
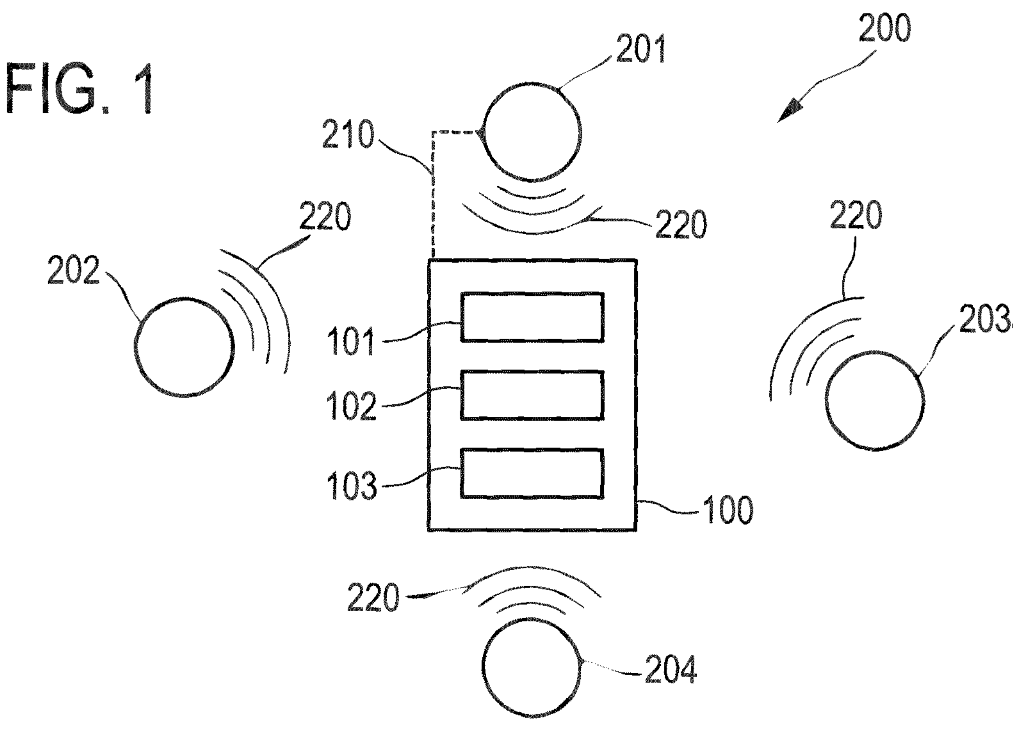
FIG. 1 shows schematically and exemplarily a configuration module of a radiofrequency sensing network according to the present invention.

FIG. 1 shows schematically and exemplarily a configuration module 100 as part of a radiofrequency sensing network 200. In the illustrated embodiment, the radiofrequency sensing network 200 comprises, apart from the configuration module 100, four network devices 201, 202, 203, 204. The configuration module 100 comprises a network information providing unit 101, an operating variable providing unit 102 and a configuration unit 103, and is, in the illustrated embodiment, connected to one network device 201 out of four network devices 201, 202, 203, 204 that are part of the radiofrequency sensing network 200. The connection 210 between the network device 201 and the configuration module 100, schematically represented in FIG. 1 by a dashed line, can be a wired or a wireless connection, and allows the configuration module 100 to configure the network device 201. In other embodiments, the configuration module 100 could also be integrated with the network device 201, wherein then the connection 210 might be an internal interface. The network devices 201, 202, 203, 204 exchange, in the illustrated embodiment, radiofrequency signals 220, i.e. wireless signals in the radiofrequency range.

The network information providing unit 101 is adapted to provide network information, wherein the network information includes information indicative of a deviation between a current sensitivity of the sensing network and a desired sensitivity of the sensing network. The operating variable determining unit 102 is adapted to determine an operating variable of the network device 201 based on a predetermined relation between the operating variable of the network device 101 and the sensitivity of the sensing network 200 and on the information indicative of the deviation between the current sensitivity of the sensing network 200 and the desired sensitivity of the sensing network such that the deviation decreases when the network device 201 is configured based on the determined operating variable. The configuration unit 103 is adapted to configure the network device 201 based on the determined operating variable.

Figure 2:
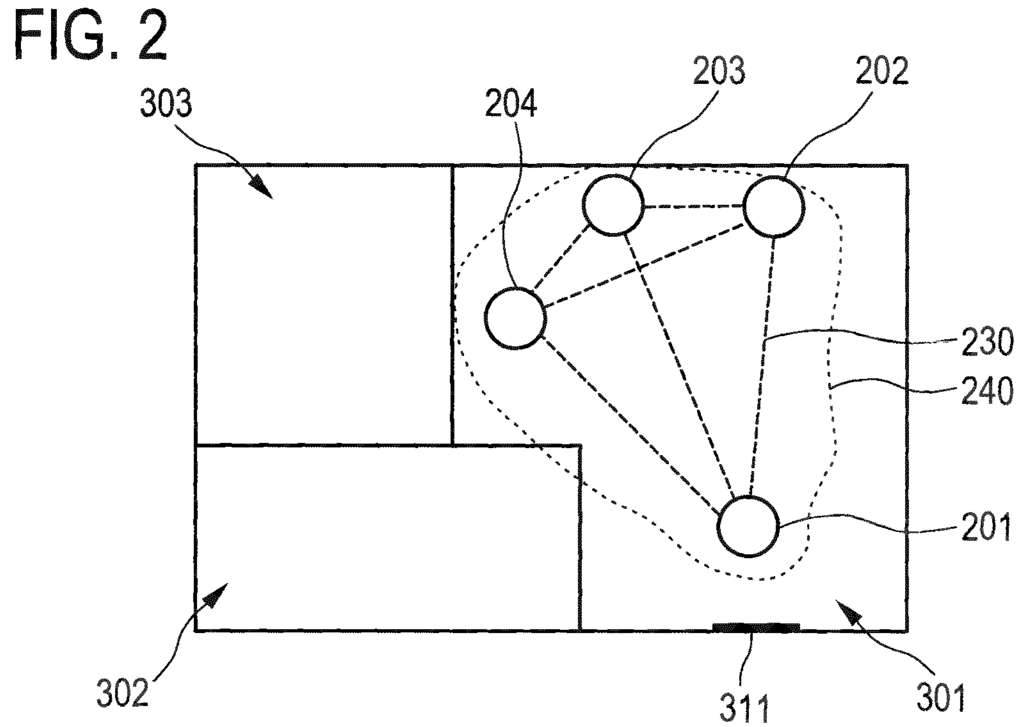
FIG. 2 shows schematically and exemplarily a radiofrequency sensing network according to the present invention installed in a residential environment, and a corresponding sensing region.

FIG. 2 shows schematically and exemplarily a radiofrequency sensing network, such as that of FIG. 1, installed in a residential environment of three adjacent rooms 301, 302, 303. The configuration module is not shown in FIG. 2. The exchange of radiofrequency signals between the network devices 201, 202, 203, 204 allows for sensing in a limited volume of space, wherein this limited volume accessible for sensing might be regarded as a sensing region 240. The sensing region 240 can be understood as an indication of a sensitivity of the radiofrequency sensing network, wherein the boundary of the sensing region may indicate where the sensitivity of the radiofrequency sensing network drops—seen from the inside of the sensing region 240 towards its outside—below a predetermined sensing threshold. This might be due to a corresponding drop in intensity of the radiofrequency signals exchanged between the network devices 201, 202, 203, 204 in some cases, but a spatial variation in sensitivity can also have different reasons, as discussed further below. FIG. 2 symbolically illustrates the wireless connections 230 between each pair of the network devices 201, 202, 203, 204 by dashed lines. While the network devices 201, 202, 203, 204 might be regarded as nodes of the radiofrequency sensing network, the connections 230 might be regarded as links between the nodes. Interpreting the radiofrequency network 200 as a graph, the network devices 201, 202, 203, 204 might be regarded as the vertices of the graph, and the connections 230 as its edges.

In the embodiment shown in FIG. 2, the network devices 201, 202, 203, 204 are all located in one room 301. Although FIG. 2, being a plan view, suggests so, it will not generally be the case that all network devices 201, 202, 203, 204 of the radiofrequency sensing network 200 are located in a common plane. The distribution of network devices 201, 202, 203, 204 in the room 301 is non-uniform, since three network devices 202, 203, 204 are located relatively densely near one, say, back, corner of the room 301, and the fourth network device 201 is located relatively far from the other three network devices 202, 203, 204 near another, say, front, corner of the room 301. In the embodiment shown, the sensing region 240 covers an irregular tetrahedron given by the network devices 201, 202, 203 204 and their pair-wise connections 230 in space, i.e. a quadrilateral in the top view of FIG. 2. The network devices 201, 202, 203, 204 of FIG. 2 do not transmit radiofrequency signals isotropically, which is one reason for the covering being such that the sensing region 240 approximates a tetrahedron as well, wherein, of course, this approximation will be relatively rough in reality due, for instance, to technical limitations in shaping the transmitted beams of radiofrequency radiation. In fact, it might often happen that the actual sensing region 240 is not confined to a desired sensing region, but extends to parts in space where sensing is not desired, at least not by the same radiofrequency network. For example, such a part in space may be a different room of a house, in which a separate set of network devices may be installed for presence and/or motion sensing in that room. In FIG. 2, this is exemplified by room 302, one of whose corners is covered by the sensing region 240, implying that a presence and/or motion sensed in that corner of the room 302 will be falsely associated by the radiofrequency sensing network with a presence and/or motion in the room 301 in which sensing is actually only desired. The overlap of the sensing region 240 into the room 302 is, however, not particularly large in the situation shown in FIG. 2, so that the risk of such a false association, i.e. the rate of false positives, will not be particularly high. In other words, the specificity of the radiofrequency sensing network will be tolerable.

While the specificity might still be tolerable in the particular case shown in FIG. 2, the sensitivity might not. For instance, if the room 301 has a door 311 located at its front corner, a user may desire an increased sensitivity in that corner, in order for the radiofrequency sensing network to be particularly sensitive to him/her entering and/or leaving the room 301. Persons entering and/or leaving a room are typically particularly important to sense in order to adequately activate and/or deactivate, respectively, functions that rely on the sensing results. In case of a lighting function, if the sensitivity is not high enough near the door 311, lights might not immediately turn on when a person enters the room, but only when the person has reached a part of the room which has sufficient sensitivity, which might only be in the middle of the room.

In order to increase the sensitivity of the sensing network, the network devices could, in principle, all be configured to transmit the radiofrequency signals used for sensing with an increased intensity. That alone would lead to an overall increased intensity of radiofrequency signals received by all network devices. Consequently, for example, the received signal strength indicator would then, at each network device, be shifted upwards by a constant amount. Instead of transmitting the radiofrequency signals used for sensing with an increased intensity, it is also possible to only process the received signals differently, while the signals are being transmitted with an unaltered physical intensity. Of course, a combination of the two approaches is also possible.

Figure 3:
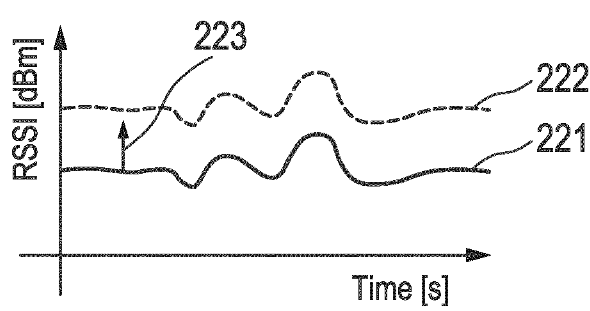
FIG. 3 shows schematically and exemplarily an intensity of a radiofrequency signal received by a network device over time, and a modification of the intensity.

FIG. 3 shows schematically and exemplarily an intensity 221 of a radiofrequency signal received by a network device over time, and a modification 223 of the intensity leading to a modified intensity 222, wherein the intensity of the signals received is measured in terms of a received signal strength indicator (RSSI), given in units of decibel-milliwatts (dBm), and time is given in units of seconds (s). The modification 223 of the intensity, which is in this case a constant shift upwards, may result from an overall increased intensity of the signals transmitted by the network devices. Preferably, however, the modification 223 is performed only during processing of the received signal. Accordingly, the modified intensity 222 may be viewed as an actual, physically increased signal intensity, but preferably as a synthetically modified intensity value. Shifting the signal intensity upwards, no matter if physically during transmission or synthetically in processing after reception, has the effect that variations in signal intensity, such as disturbances caused by the presence or motion of a sensing target like a human body, will be pronounced and therefore have a greater impact during any signal analysis performed for arriving at a sensing result. In general, the modification 223 may be a shift by, for instance, 4 decibel (dB), but could, in principle, also be a shift by any other amount.

An undifferentiated increase in transmission intensity by all network devices or, likewise, an undifferentiated synthetic modification of intensity values as received by all network devices, would lead to an overall enlarged sensing region. In particular, it will become more likely that the sensing region also covers parts of space in which no sensing is desired, such as other rooms. This is because the absorption by walls separating the rooms will be compensated by increasing the signal intensity. Hence, increasing the sensitivity by increasing the signal intensity will likely lead to an unacceptably low specificity.

Figure 4:
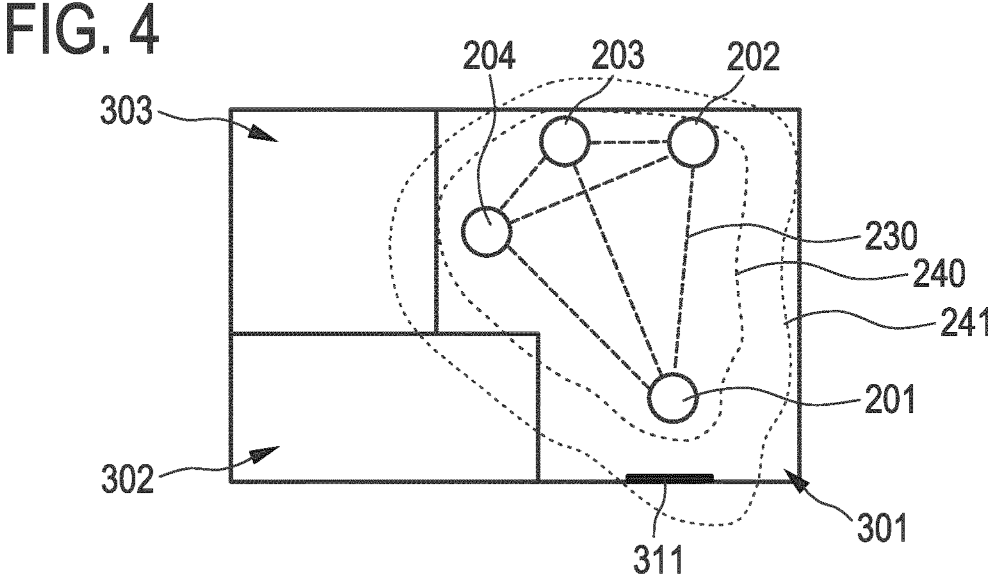
FIG. 4 shows schematically and exemplarily the radiofrequency sensing network of FIG. 2 with a different configuration of its network devices, and a corresponding change in sensing region resulting from the different configuration of its network devices.

FIG. 4 shows schematically and exemplarily such an undesirable situation, i.e. the radiofrequency sensing network of FIG. 2 with a configuration of its network devices as described above, and a corresponding change in sensing region indicative of an increased sensitivity, but also of a decreased specificity. While the enlarged sensing region 241 almost completely covers room 301, it has also an enlarged overlap with room 302, and additionally a new overlap with room 303. In fact, the sensing region 241 is even no longer confined to the whole residence, if the residence consists of the three rooms 301, 302, 303.

In the case that a lighting function relies on the sensing results, for instance, the situation shown in FIG. 4 may allow for accurate and fast switching of light when a person entering and/or leaving room 301 is sensed. But, on the other hand, light in the room 301 may also be switched on if the person is actually in another room 302, 303, due to the corresponding overlap of the enlarged sensing region 241. This does not only lead to an unnecessary consumption of electricity, but may be particularly inconvenient in the evening, when the person is still awake in one of the rooms 302, 303 while his/her child is already asleep in room 301 and is not supposed to be disturbed.

Figure 5:
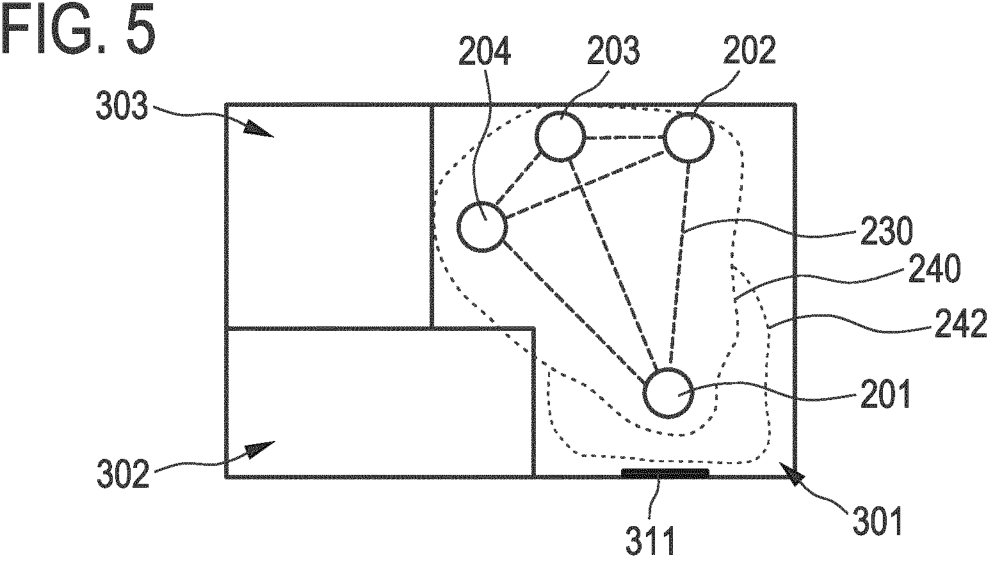
FIG. 5 shows schematically and exemplarily the radiofrequency sensing network of FIG. 2 with a configuration of its network devices different from that of FIGS. 2 and 4, and a corresponding change in sensing region resulting from the different configuration of its network devices.

FIG. 5 shows schematically and exemplarily the radiofrequency sensing network of FIG. 2 with a configuration of its network devices different from that of FIGS. 2 and 4, and a corresponding change in sensing region from a sensing region 240 to a sensing region 242 resulting from the different configuration of its network devices. In the illustrated embodiment, the sensitivity of the sensing network is space-dependent.

In the embodiment shown in FIG. 5, the network information providing unit of the configuration module, which is not shown in FIG. 5, has provided network information, wherein the network information was indicative of a deviation between a current sensitivity of the sensing network and a desired sensitivity of the sensing network. For instance, the user may have indicated via an application on its smartphone that he/she is not satisfied with the sensitivity of the sensing network in the front corner of the room and that he/she desires an increased sensitivity in that corner. Hence, the deviation between the current sensitivity of the sensing network and the desired sensitivity of the sensing network is a deviation in a region of space. The network information may also include information indicating that the network device 201 is located in or near that corner. That information may have been stored beforehand, such as during a calibration procedure upon installation of the sensing network, or it may have been indicated by the user as well, together with the indication of him/her desiring an increased sensitivity.

Then, the operating variable determining unit has determined an operating variable of the network device 201 based on a predetermined relation between the operating variable of the network device 201 and the sensitivity of the sensing network and on the information indicative of the deviation between the current sensitivity of the sensing network and the desired sensitivity of the sensing network such that the deviation decreases when the network device 201 is configured based on the determined operating variable. Determining the operating variable may have involved, in the embodiment shown, determining a degree of modification for a radiofrequency signal received by the network device 201, wherein the modification comprises an amplification. In particular, the determined operating variable may be a degree of amplification for signals received by the network device 201. In that case, for instance, the predetermined relation between the operating variable and the sensitivity may be understood as the following: If the degree of amplification for signals received by the network device 201 increases, then the sensitivity of the sensing network increases as well, in particular in a region around the network device 201. The relation between the operating variable of the network device and the sensitivity of the sensing network is thus space-dependent. Based on this predetermined relation, and since the user has indicated that he/she desires an increased sensitivity, the operating variable determining unit has determined that the degree of amplification for signals received at the network device 201, i.e. the operating variable concerned, is to be increased.

Then, the network device 201 has been configured by the configuration unit such that it executes its sensing function in the sensing network based on the modified, i.e., in this case, amplified, signals, wherein the modified, i.e., in this case, amplified, signals are determined by the radiofrequency signals received by the network device and the degree of modification, i.e., in this case, amplification. This has caused the changed sensing region 242. For instance, the degree of amplification is a constant upward shift 223 as shown in FIG. 3, in which case the intensity of a modified signal 222 is the sum of this shift 223 and the intensity 221 of the signal as received by the network device 201.

Since the degree of amplification is increased for the network device 201, the sensitivity of the sensing network is increased in a region around the network device 201, without generating additional overlaps of the sensing region into parts of space where sensing is not desired, i.e. without decreasing the specificity. In particular, since the network device 201 is located close to the door 311 in the front corner of the room 301, the sensitivity is increased exactly where the user has indicated a lack of sensitivity being present. As described above, the increased sensitivity is a result of variations in signal intensity being pronounced by the upward shift in intensity and therefore becoming more impactful in an analysis performed for arriving at a sensing result. If the upward shift is performed only for processing the signals received by network device 201, also the corresponding increase in sensitivity is localized around that network device 201.

In some embodiments, the configuration module is adapted to configure the network device iteratively. In these embodiments, the network information providing unit, the operating variable determining unit and the configuration unit are adapted to execute the above described steps of providing network information, determining the operating variable and configuring the network device, respectively, periodically until the deviation between the current sensitivity of the sensing network and the desired sensitivity of the sensing network falls below, or reaches, a predefined termination threshold. For instance, the degree of amplification may, in each iteration, be a shift in intensity by a constant amount, such as, for instance, corresponding to 4 dB in RSSI value, in which case, after each iteration, the deviation between the current sensitivity and the desired sensitivity would decrease by a corresponding constant amount. It is also possible that the degree of amplification decreases with the number of performed iterations, which might allow for a more accurate conversion of the sensitivity to the desired one. Also during such an iterative configuration of the network device, the information indicative of the deviation between the current sensitivity of the sensing network and the desired sensitivity of the sensing network may be provided by the network information providing unit according to an indication by a user, such as according to a user input via an application on a smartphone. In the case of an iterative configuration, the deviation might be regarded as a remaining deviation. As is generally the case, when making such an indication, the user may already take into account him- or herself whether increasing the sensitivity might also decrease the specificity, such as by increasing false positives in a room where sensing is not desired, in which case he might choose not to indicate that the sensitivity is to be increased. An indication not to further increase the sensitivity would lead to a termination of the iterative configuration of the network device, as if the deviation between the current sensitivity and the desired sensitivity had fallen below, or reached, a predefined termination threshold.

Although, in describing FIG. 5, reference has been made to determining a degree of amplification in accordance with FIG. 3, determining the operating variable of the network device 201 using other degrees of modification leads to the same or similar results. Moreover, FIG. 5 has been described as illustrating embodiments where the network device 201 is configured. However, the same or similar results may equally be achieved by, additionally or alternatively, configuring the other network devices 202, 203, 204. For instance, the changed sensing region 242 may also be achieved if signals received by the network devices 202, 203, 204 from the network device 201 are amplified, in addition or alternatively to amplifying signals received by the network device 201.

Figure 6:
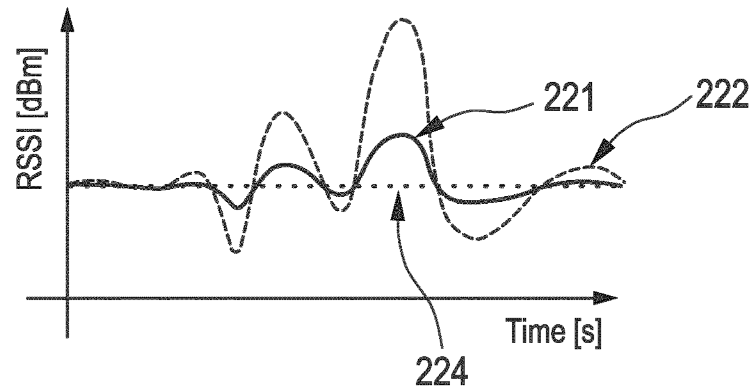
FIG. 6 shows schematically and exemplarily an intensity of a radiofrequency signal received by a network device over time, and a modification of the intensity different from the modification shown in FIG. 3.

FIG. 6 shows schematically and exemplarily an intensity of a radiofrequency signal received by a network device over time, and a modification of the intensity different from the modification shown in FIG. 3. The intensity of the signals received is measured in terms of an RSSI, given in units of decibel-milliwatts, and time is given in units of seconds.

In the embodiment shown in FIG. 6, the degree of modification is defined relative to an average value 224 of radiofrequency signals received by the network device. In particular, the modified signal intensity 222 does therefore not arise by only a constant shift from the intensity 221 of the signal received by the network device. The average value may have been determined according to any of a plurality of ways, as described further above. For example, the average value 224 may correspond to an average intensity of signals received by the network device over a plurality of time windows in the past that match a current time with respect to the time of day. According to FIG. 6, the modified signal intensity 222 at a given point in time is exemplified by 20% with respect to the corresponding non-modified signal intensity at the respective point in time if the non-modified signal intensity 221 is greater than the average value 224, whereas the modified signal intensity 222 at a given point in time is attenuated by 20% with respect to the corresponding non-modified signal at the respective point in time if the non-modified signal intensity is less than the average value 224. The degree of modification might therefore, in this case, be regarded as being symmetric with respect to the average value. The modified signal intensity might be written as $I'=(1+\tilde{\alpha})\cdot I$ if $I>A$ and by $I'=(1-\tilde{\alpha})\cdot I$ if $I<A$, wherein I refers to the non-modified intensity of the signal received by the network device, A refers to the average value, and $\tilde{\alpha}=0.2$, in this case. Of course, other values of $\tilde{\alpha}$ are possible. It is apparent from FIG. 6 that modifying the signal intensity with respect to an average value may lead to spikes in the signal being enlarged and dips being shrunk, such that a presence and/or motion near the network device will be sensed with a higher significance. Compared with a modification of signal intensity as shown in FIG. 3, modifying the signal intensity as shown in FIG. 6 may also be beneficial in extracting more complex metrics from the signal, which might be needed for more difficult sensing applications, such as sensing target localization, for instance.

In an example, the operating variable determining unit may have determined that a signal intensity is to be modified according to FIG. 6 based also on an information provided by the network information providing unit indicative of the network device being located in a distance below a predetermined threshold from a wall, such as, for instance, from a dry wall separating room 301 from room 302.

Figure 7:
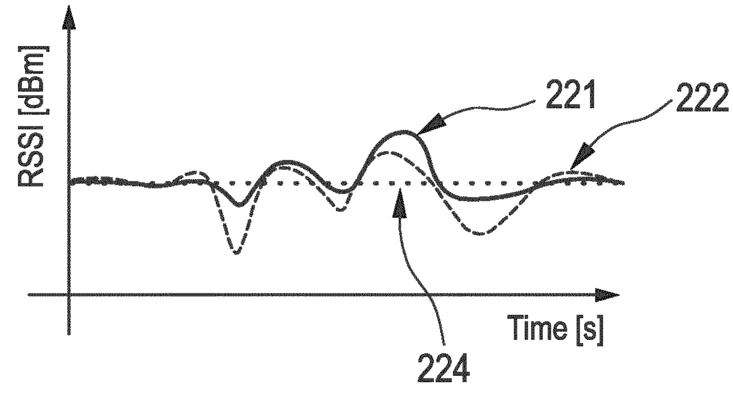
FIG. 7 shows schematically and exemplarily an intensity of a radiofrequency signal received by a network device over time, and a modification of the intensity different from the modification shown in FIGS. 3 and 6.

FIG. 7 shows schematically and exemplarily an intensity of a radiofrequency signal received by a network device over time, and a modification of the intensity different from the modification shown in FIGS. 3 and 6. The intensity of the signals received is measured in terms of an RSSI, given in units of decibel-milliwatts, and time is given in units of seconds.

In the embodiment shown in FIG. 7, the degree of modification of the radiofrequency single received by the network device depends on an intensity of the received radiofrequency itself. It can be clearly seen that intensity values lying below the average value 224 are being attenuated by a degree similar as in FIG. 6, and intensity values lying above the average value are being attenuated as well. Hence, in the embodiment shown in FIG. 7, $\tilde{\alpha}$ splits into $\tilde{\alpha}_+$ and $\tilde{\alpha}_-$, depending on whether the signal intensity lies above or below the average value, wherein, in this case, $\tilde{\alpha}_+$ assumes a value that is smaller than the value of $\tilde{\alpha}$ illustrated by FIG. 6.

Figure 8:
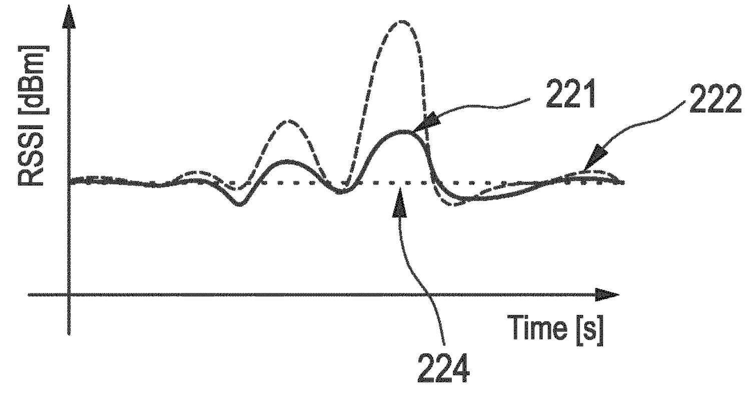
FIG. 8 shows schematically and exemplarily an intensity of a radiofrequency signal received by a network device over time, and a modification of the intensity different from the modification shown in FIGS. 3, 6 and 7.

FIG. 8 shows schematically and exemplarily an intensity of a radiofrequency signal received by a network device over time, and a modification of the intensity different from the modification shown in FIGS. 3, 6 and 7. The intensity of the signals received is measured in terms of an RSSI, given in units of decibel-milliwatts, and time is given in units of seconds.

The embodiment shown in FIG. 8 may be viewed as being opposite to the one shown in FIG. 7. In this embodiment, signal intensities lying above the average value 224 are being amplified, and signal intensities lying below the average value 224 are being amplified as well. Hence, also in this embodiment, a splits into $\tilde{\alpha}_+$ an $\tilde{\alpha}_-$, wherein, in this case, $\tilde{\alpha}_-$ assumes a value that is smaller than the value of $\tilde{\alpha}$ illustrated by FIG. 6.

Figure 9:
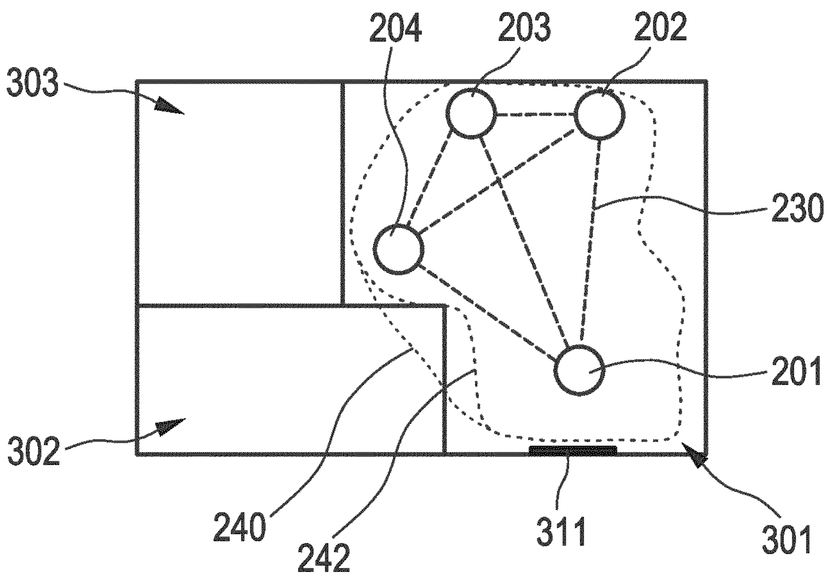
FIG. 9 shows schematically and exemplarily a radiofrequency sensing network according to the present invention installed in a residential environment differently from that shown in FIGS. 2, 4 and 5, and a corresponding sensing region for two different configurations.

FIG. 9 shows schematically and exemplarily a radiofrequency sensing network according to the present invention installed in a residential environment differently from that shown in FIGS. 2, 4 and 5, and a corresponding sensing region for two different configurations. The installation of the radiofrequency sensing network according to FIG. 9 differs from the installation according to FIGS. 2, 4 and 5 in that the network device 204 is located slightly differently, namely in a corner of room 301 created by walls separating room 301 from rooms 302 and 303, respectively. Loosely speaking, such an installation is representative of a situation where one network device is somewhat hidden as viewed from one or more other network devices, due to some obstruction being present, such as a piece of furniture or, as is the case in the embodiment shown in FIG. 9 between network devices 201 and 204, a corner of a room. In this embodiment, the sensing region 240 already sufficiently covers the front corner of the room where the door 311 is located, resulting in a sensitivity as desired. This may have been achieved by configuring the network device 201 in terms of an increased degree of amplification for signals received by that network device 201 and/or by configuring the other network devices 202, 203, 204 in terms of an increased degree of amplification for signals received from the network device 201. In particular, in this way it may have been avoided that the sensing region has an overlap with room 303. However, due to the location of network device 204, this may not have been enough to avoid also an overlap of the sensing region 240 with the room 302. This overlap is clearly visible in FIG. 9. Again, this overlap may result in an unacceptably low specificity of the sensing network due to potential false positives in room 302. In such a situation, where the radiofrequency sensing network comprises a plurality of network devices, the degree of modification for the radiofrequency signal received by the network device 201 may depend on which of the further network devices has transmitted the radiofrequency signal and/or on a state of the further network device which has transmitted the radiofrequency signal. For instance, in the situation shown in FIG. 9, the modification may be an attenuation, and the attenuation may only be applied to signals received by the network device 201 from the network device 204, whereas signals received by the network device 201 from any of the other network devices 202, 203 remain unmodified. In this way, the sensitivity along the link between network devices 201 and 204 is decreased, while the sensitivity corresponding to the links between the network device 201 and any of the network devices 202, 203 remains unchanged. The same or a similar exclusive decrease in sensitivity along the link between network devices 201 and 204 may be achieved or even emphasized by alternatively or additionally, respectively, applying an attenuation to signals received by the network device 204 from the network device 201, whereas signals received by the network device 204 from any of the other network devices 202, 203 remain unmodified.

The resulting sensing region 242 no longer has any substantial overlap with the room 302. It follows from this embodiment that, by configuring the network devices of a radiofrequency sensing network appropriately, the sensing region of the sensing network can be adapted to fit very accurately into a given spatial region, although the locations of the network devices are not changed.

FIG. 9 also serves to illustrate an embodiment according to which determining the operating variable involves determining a rate at which the network device transmits radiofrequency signals. The rate at which the network device transmits radiofrequency signals may be referred to as a transmission rate. The transmission rate may, for instance, be determined such that it is increased or decreased with respect to a current transmission rate by a predetermined factor, or it may be determined such that it is higher or lower than the transmission rate of another network device in the sensing network by a predetermined factor. Referring to FIG. 9, the transmission rate of the network device 201 may, for instance, be determined such that it is higher than the transmission rate of the network device 204 by a predetermined factor. Such an increase in transmission rate has the effect that, even in the absence of any modification in signal intensity, any analysis of the signals exchanged within the sensing network will be fed with more data. The region for which the increased amount of data is collected is determined by the location of the network device whose transmission rate is chosen to be increased. In the above described case, this would be the network device 201. Increasing the transmission rate may also lead to data that can be better filtered and thus allow for analysis with a higher spatial and/or temporal resolution. More subtle adjustments in localized sensitivity, i.e. more subtle adjustments of the sensing region of the sensing network might therefore become possible. In fact, increasing the transmission rate may be particularly beneficial for sensing fast and/or small-scale motions, such as, for instance, gestures as opposed to full-body motion, and/or it may allow for a decreased latency in sensing, due to the increased amount of data collected in a given time. Of course, a change in transmission rate of a network device can be combined with other changes in its operating variables, in particular with modifications in intensity of the signals it transmits or of the signals it receives.

The network information may further include information indicative of a sensing load on the sensing network, wherein the operating variable determining unit may be adapted to determine the operating variable further based on the information indicative of the sensing load. For instance, a decrease in transmission rate may generally be beneficial, in particular if the amount of signals exchanged in the sensing network in a given time, i.e. the overall network traffic or load, becomes critical. This will generally be the case when, for instance, the size of the sensing region of the sensing network supersedes a predetermined size. A decrease in transmission rate may be particularly beneficial if it is combined with an increased signal intensity. A decrease in transmission rate may be determined for all network devices or only those network devices at which a critical traffic or load is present, possibly due to limited technical resources, like a limited bandwidth, specific to those network devices. Preferably, the transmission rate is determined, possibly in combination with the modification in signal intensity, such that neither the sensitivity nor the specificity of the sensing network is noticeably changed, i.e. such that the sensing region stays substantially the same.

Figure 10:
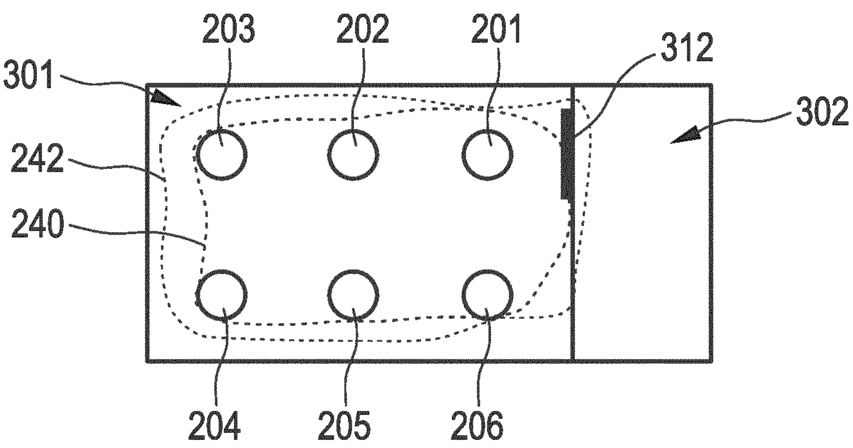
FIG. 10 shows schematically and exemplarily a radiofrequency sensing network according to the present invention installed in a meeting room, and a corresponding sensing region for two different configurations.

FIG. 10 shows schematically and exemplarily a radiofrequency sensing network according to the present invention installed in a meeting room 301, and a corresponding sensing region for two different configurations. The meeting room shares a solid wall with a hallway 302, wherein the wall comprises a door 312. In the meeting room 301, six network devices 201, 202, 203, 204, 205, 206 are installed in the form of light modules hanging from or mounted to the ceiling of the meeting room 301. The network devices 201, 202, 203, 204, 205, 206 form, together with a configuration module not shown in FIG. 10, a radiofrequency sensing network, or part of a radio frequency sensing network. The light output of the light modules is controlled based on sensing results of the sensing network. Sensing, in this case, also refers to people counting, such that the sensing results also comprise a number of people present in the meeting room 301, which might change each time a person is entering or leaving the meeting room 301 through the door 312. People counting by radio frequency sensing generally requires high accuracy, which is critical in the illustrated situation, in addition to low latency and high stability of sensing.

FIG. 10 primarily illustrates embodiments according to which the network information further includes information indicative of a sensing result and a sensing need depending on the sensing result, wherein the operating variable determining unit is adapted to determine the operating variable further based on the information indicative of the sensing result and the sensing need depending on the sensing result.

In the situation shown in FIG. 10, a default configuration of the sensing network may be such that the sensing need is substantially localized, or at least highest, near the door 312. This may be accounted for by configuring the network device 201 as described with respect to FIG. 5, and may lead to the sensing region 240. The sensing region 240 covers, in the illustrated case, still a major part of the meeting room 301, which may in other cases not be so. As long as the sensing region is localized, or at least highest, near the door 312, a sensing result may consist in sensing a person entering the room. In the illustrated case, although the sensitivity of the sensing network is allowed to be relatively high near the door 312 by, for instance, increasing the intensity of signals received by the network device 201 relatively strongly, there is still only a small overlap of the sensing region 240 with the hallway 302, due to the solid wall separating the meeting room 301 from the hallway, and to a possibly slightly lower degree also the door 312, attenuating signals relatively strongly.

Once a positive sensing result has been acquired in the default configuration, i.e. once it has been sensed that a person has entered or is entering the meeting room 301 and therefore the light modules have been controlled to start generating light output, the sensing need is changed. That is to say that the sensitivity of the sensing network is shifted from the door 312 towards the interior of the meeting room 301, leading to a changed sensing region 242, in order to allow for more accurate counting of the people present in the meeting room 301, who likely sit in its interior. For this purpose, for instance, the intensity of the signals received at the network device 201 may be decreased again, whereas the intensity of the signals received by the other network devices 202, 203 may be slightly increased. The change from sensing region 240 to sensing region 242 also has the effect that temporary false positives, namely persons passing the door 312 along the hallway 302 being sensed or counted, which may result from the door 312 temporarily standing open while the meeting room 301 fills with people, are avoided.

Once the number of people determined by the sensing network as being present in the meeting room 301 becomes zero, such as, for instance, after a meeting has ended and people have left the meeting room 312, the sensing network may be configured to wait a predetermined transition time and then resume to its default configuration. The transition time may also be dispensable.

Additionally or alternatively to people counting, the sensing network installed and configured according to FIG. 10 may also allow for gesture sensing. In this case, a sensing result may be a predefined gesture, on the basis of which a multimedia device in the meeting room 301 is controlled. For instance, a television device in the meeting room 301 may be turned on or off when a person waves his/her hands in a predefined manner. Also in this case it is beneficial to concentrate the sensitivity of the sensing network in the interior of the meeting room 301 once a person has been sensed entering the meeting room 301, as described above with respect to people counting. For example, this would avoid accidentally turning the television device on or off when people are standing and talking in the hallway 302 using the predefined gesture by accident.

In a similar, residential situation, additionally or alternatively to people counting and gesture control, the sensing network may serve a security and/or notification purpose. For instance, security warnings in the form of alarm signals may be generated in response to sensing the presence of a person intruding a house in which the sensing network is installed. Alarm signals may be acoustic signals and/or may be visual alarm signals, such as a light flashing red and/or blue to scare off the intruding person. Also in this situation the default configuration of the sensing network could correspond to a state in which no presence has been sensed, i.e. in which, for instance, no member of the family living in the house is at home. In this default state, the sensing region may be relatively large, so as to cover a relatively large region around the house. In this way, persons intruding the house in relatively many ways will be sensed and therefore trigger an alarm. On the other hand, if a member of the family is at home, as sensed, for instance, as a presence extending in time beyond a predefined time threshold and/or as indicated to the sensing network in a different way, such as, for instance, by an authorized family member providing an input via an application on a smartphone, then the sensing region may be localized to a region in front of the front door of the house, and sensing results will trigger, instead of alarm signals, notifications issued to the smartphone of the user, informing the user about a visitor. In fact, according to some embodiments, in the same situation, no change in sensing region takes place. Instead, the sensing may always be localized in front of the front door, and the sensing network is configured to only provide its sensing results as a basis for a different function. Namely, as long as no family member is at home, sensing a presence in front of the front door will lead to an alarm, while as soon as a family member is at home, it will lead only to a notification sent out to the family member's smartphone.

In a similar example according to which the sensing region of the sensing network becomes time-dependent, the transmission rate of a network device located in the base floor of a house may be increased at night while the transmission rate of a network device located in a bedroom of the house may be decreased at night. This may be beneficial for sensing intruders without subjecting users to excess radiation while at sleep.

Preferably, according to embodiments illustrated by FIG. 10, the network information further includes information indicative of a location of the network device, wherein the operating variable determining unit is adapted to determine the operating variable further based on the information indicative of the location of the network device. This is particularly preferred if the configuration module is adapted to configure multiple or all of the network devices 201, 202, 203, 204, 205, 206. In this case, the operating variable determining unit may be adapted to determine the operating variable of a given network device in the default configuration as being increased with respect to a corresponding operating variable of the other network devices only if the location of the network device is closest to the door 312. The information indicative of the location of the network device may have been provided by the network information providing unit based on a user input upon installation of the sensing network in the meeting room 301, since it is unlikely to change over time. However, it may also be re-input by a user at a later point in time.

In yet a further situation similar to the one illustrated in FIG. 10, embodiments may be preferred according to which the network information further includes information indicative of a sensing mode and/or a sensing need of the sensing network, wherein the operating variable determining unit is adapted to determine the operating variable further based on the information indicative of the sensing mode, the sensing need of the sensing network and/or a predetermined radiation tolerance.

In particular, it is preferred to determine the transmission rate of the network device, or whether the transmission rate is to be decreased, based on a sensing mode and/or sensing need of the sensing network.

Such a situation would be given if the network devices of the sensing network are installed in different rooms of a house, one of the rooms being a room where a parent's baby is sleeping. In this case, the sensing mode of the sensing network in the room where the baby is sleeping may be breathing detection. As long as the sensing network does not sense the parent's presence in that room, the sensing need associated with breathing detection in that room may be high, and preferably maximal. Upon sensing a change in breathing pattern, notifications may be provided to the parent, such as via his/her smartphone. As soon as the sensing network does sense the parent's presence in the room where the baby is sleeping, the sensing need associated with the breathing detection in that room may be reduced. Based on the reduced sensing need, the operating variable determining unit may determine that the transmission rate of the network devices in that room is to be decreased while the intensity of signals received by network devices in that room is to be increased. Even if this changed configuration leads to a lower sensitivity in the room, this lowered sensitivity may be tolerable given the presence of the parent. In the same situation, the changed configuration is only applied to those network devices near the bed in which the baby is sleeping.

Figure 11:
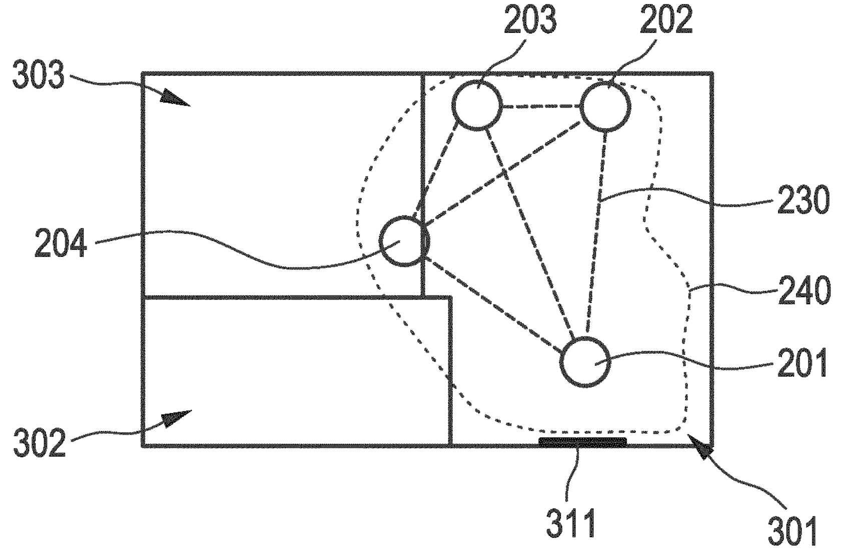
FIG. 11 shows schematically and exemplarily a radiofrequency sensing network according to the present invention installed in a residential environment differently from that shown in FIGS. 2, 4, 5 and 9, and a corresponding sensing region.

FIG. 11 shows schematically and exemplarily a radiofrequency sensing network according to the present invention installed in a residential environment differently from that shown in FIGS. 2, 4, 5 and 9, and a corresponding sensing region. The installation of the radiofrequency network according to FIG. 11 differs from the installation according to FIGS. 2, 4, 5 and 9 in that the network device 204 is not located in the room 301 in which the other network devices 201, 202, 203 are located, but in room 303. Also, the wall separating the rooms 301, 303 is, in FIG. 11, located a bit further to the right, thereby making room 301 a bit smaller in favor of room 303. The wall may be a solid wall, potentially attenuating signals transmitted through it strongly. FIG. 11 illustrates that the network device 204 may be mounted to the wall, as would be typical in case the network device 204 is a smart switch. The location of the network device 204 may be indicated by a user and provided by the network information providing unit as network information. Based on the indicated location as provided by the network information providing unit, and based on a stored relation indicating that an increased intensity of signals received by the network device 204 will increase the sensitivity in a neighborhood of network device 204, the operating variable determining unit of the network device 204 may or may not determine that the intensity of signals received by the network device 204 is to be increased if the network information providing unit has provided information indicating that the current sensitivity of the sensing network is below a desired sensitivity. In the situation illustrated in FIG. 11, the operating variable determining unit preferably determines that the intensity of received signals is not increased, since this would only increase the sensitivity of the sensing network in the center of the room 301 by a relatively small amount, while potentially decreasing the specificity in room 302 by an intolerable amount.

Figure 12:
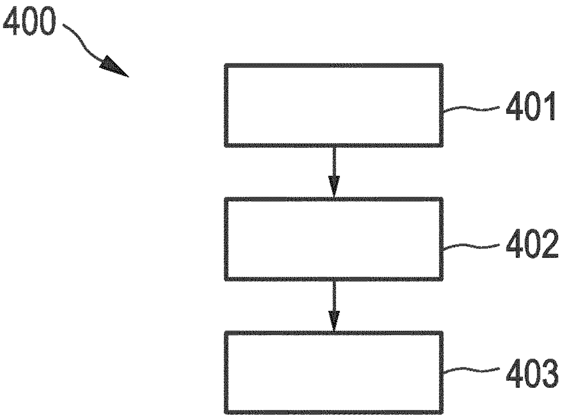
FIG. 12 shows schematically and exemplarily a configuration method according to the present invention.

FIG. 12 shows schematically and exemplarily a configuration method 400 for configuring a network device of a radiofrequency sensing network. In a first step 401, network information is being provided, wherein the network information includes information indicative of a deviation between a current sensitivity of the sensing network and a desired sensitivity of the sensing network. In a second step 402, an operating variable of the network device is being determined based on a predetermined relation between the operating variable of the network device and the sensitivity of the sensing network and on the information indicative of the deviation between the current sensitivity of the sensing network and the desired sensitivity of the sensing network such that the deviation decreases when the network device is configured based on the determined operating variable. In a third step 403, the network device is being configured based on the determined operating variable.

This invention describes different criteria and methods for locally modifying the sensitivity of a sensing network by determining operating variables of a subset of network devices of the sensing network installed in an area where sensing is supposed to take place. The sensing network is allowed to easily adapt to a given context, such as a network device being located too close to a wall or door and therefore picking up too often signals indicative of people outside of the area in which sensing is supposed to take place, without compromising the overall sensitivity. As all network devices act in a distributed way, this leads to a behavior different from that of a collection of individual sensors with independent sensitivities.

These adaptions can be done only once, based on calibration or configuration metadata, or dynamically, based on contextual information about the use of the area where sensing is supposed to take place and/or of surrounding areas. For instance, the adaptions can change depending on a sensed or known presence in a room and/or adjacent areas.

Although in many cases it does not require dedicated hardware, radiofrequency sensing is subject to hardware related effects concerning the way the transmission and reception of signals take place. Radiofrequency signals can go through walls (with a certain amount of attenuation), get reflected by furniture or appliances or walls, be absorbed by other materials, et cetera, meaning that it is usually not possible to obtain a well-defined detection area (or design for such). Usually, the placement of network devices participating in radiofrequency sensing can influence significantly whether a positive detection can take place closer or further away from a desired detection area. However, placement of those network devices is typically determined by their main purpose (for instance, providing light or controlling a plug load) rather than being optimized for radiofrequency sensing. Operating variables of the network devices such as the intensity at which the radiofrequency signals are transmitted, the upper and lower sensing threshold, the antenna directionality, any beam shaping or radiation patterns, but also materials of the housing of the network devices themselves can all also affect the resulting sensing region.

In addition, the building material of walls also influences radiofrequency sensing. In an apartment, a bedroom may consist of a first wall shared with the living room and a second wall shared with the TV room. The first wall may be a brick wall serving a structural purpose within the house, while the second wall is a plaster-wood-only wall. Consequently, a first smart plug mounted to the first wall will leak less into the living room as compared to a second smart plug mounted to the second wall leaking into the TV room.

As a result, the user usually has some trade-offs to make. If the goal is to achieve optimal sensing in a given desired area, it is very likely that this leads to a sensitivity becoming too high in adjacent areas, leading to extrinsic false positives (i.e. people in adjacent areas get detected as if they were within the desired area). On the other hand, if the goal is to limit (prevent) extrinsic false positives from adjacent areas as much as possible, the user might need to reduce sensitivity in the desired area to a point where he/she might no longer be sensed while inside it, latency increases, or the sensing performance in general degrades (false negatives).

This invention aims at allowing the system to modify (at application level) the sensitivity of only certain network devices within a given area where sensing is supposed to take place, such that, from a user perspective, the result is a more adjustable performance in parts of the area without negatively impacting the performance of the rest of the area. This differs in principle from known systems for adjusting the sensitivity of sensors, since each network device is not per se a sensor (such that tuning operating variables, such as an upper and/or lower sensing threshold, of the individual network devices leads to an improved overall area due to the collection of effects). Instead, it is a data gathering element which is part of a distributed sensor. Also, each network device communicates via signaling connections with various other network devices. Operating variables of the various network devices can be tuned independently, so that some connections from a certain network device are adjusted, while others are not adjusted.

The invention refers to a radiofrequency sensing network with preferably at least three nodes, such that there is more than one signaling connection available. It may further refer to a calibration step, which can be done statically based on metadata, actively by means of an automated test, or actively by means of actions done by a user, wherein the calibration step determines the relative contribution of each link of each node to the overall sensing region and/or detection performance. A mechanism for either the sensing network or the user to collect contextual information about which (set of) network devices or which (set of) connections between the network devices in the area where sensing is supposed to take place need to have operating variables modified is also referred to. The invention also relates to an adjustment algorithm which decides for each connection between the network devices and based on the contextual information gathered what type of adjustment should be done to the operating variable associated with a given network device or connection to improve the overall sensing performance.

Although, in the above described embodiments, the exchange of radiofrequency signals between the network devices of the radiofrequency sensing network was related to sensing, the same or other radiofrequency signals may be exchanged by the network devices for further communication within the network, wherein the further communication may not relate to sensing, but, for instance, to a different function of the network devices.

Although, in the above described embodiments, the sensing network was a radiofrequency sensing network, the sensing network may also be a more general sensing network, in particular a non-radiofrequency sensing network. The network devices of the sensing network may then be adapted to exchange wireless signals constituted by electromagnetic radiation outside the radiofrequency range for sensing, and possibly also for communication not relating to sensing, such as, for instance, relating to a different function of the network devices.

Although, in describing the above embodiments, the signals exchanged between the network devices were referred to by their intensity, they could also be referred to by their power. In fact, the described signal intensities, and their modifications, could be understood as indicating corresponding signal powers.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Procedures like the providing of network information, the determining of the operating variable and the configuring of the network device, et cetera, performed by one or several units or devices can be performed by any other number of units or devices. These procedures can be implemented as program code means of a computer program and/or as dedicated hardware.

A computer program product may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

A configuration module for configuring a network device of a radiofrequency sensing network is provided. The control module comprises a network information providing unit for providing network information, wherein the network information includes information indicative of a deviation between a current sensitivity of the sensing network and a desired sensitivity of the sensing network. The control module further comprises an operating variable determining unit for determining an operating variable of the network device based on a predetermined relation between the operating variable of the network device and the sensitivity of the sensing network and on the information indicative of the deviation between the current sensitivity of the sensing network and the desired sensitivity of the sensing network such that the deviation decreases when the network device is configured based on the determined operating variable, and a configuration unit for configuring the network device based on the determined operating variable.

The invention claimed is:

1. A network device of a radiofrequency sensing network, the network comprising:

a configuration module having a network information provider for providing network information, the network information including information indicative of a deviation between a current sensitivity of the radiofrequency sensing network and a desired sensitivity of the radiofrequency sensing network, the configuration module being configured to:

determine an operating variable of the network device based on a predetermined relation between the operating variable of the network device and the sensitivity of the radiofrequency sensing network and on the information indicative of the deviation between the current sensitivity of the radiofrequency sensing network and the desired sensitivity of the radiofrequency sensing network such that the deviation decreases when the network device is configured based on the determined operating variable, the operating variable of the network device including a parameter used for processing radiofrequency signals received by the network device or to a setting based on which the network device receives and/or transmits radiofrequency signals, and configure the network device based on the determined operating variable;

wherein the network information further includes information indicative of a sensing result and a sensing need depending on the sensing result, and the configuration module is configured to determine the operating variable further based on the information indicative of the sensing result and the sensing need depending on the sensing result.

2. The network device according to claim 1, wherein the sensitivity of the radiofrequency sensing network and the relation between the operating variable of the network device and the sensitivity of radiofrequency the sensing network are space-dependent, the deviation between the current sensitivity of the radiofrequency sensing network and the desired sensitivity of the radiofrequency sensing network is a deviation in a region of space, and the configuration module is adapted to determine the operating variable further based on the relation between the operating variable of the network device and the sensitivity of the radiofrequency sensing network in the region of space.

3. The network device according to claim 1, wherein determining the operating variable involves determining a degree of modification for a radiofrequency signal received by the network device, the degree of modification including an amplification and/or attenuation, wherein the configuration module is configured to execute a sensing function in the radiofrequency sensing network based on a modified signal, and the modified signal is determined by a radiofrequency signal received by the network device and the degree of modification.

4. The network device according to claim 3, wherein the degree of modification is defined relative to an average value of radiofrequency signals received by the network device.

5. The network device according to claim 3, wherein the degree of modification for the radiofrequency signal received by the network device depends on an intensity of the received radiofrequency signal itself.

6. The network device according to claim 3, wherein the radiofrequency sensing network comprises additional network devices, wherein the degree of modification for the radiofrequency signal received by the network device depends on which of the additional network devices has transmitted the radiofrequency signal and/or on a state of the one of the additional network devices that transmitted the radiofrequency signal.

7. The network device according to claim 1, wherein determining the operating variable involves determining a rate at which the network device transmits radiofrequency signals.

8. The network device according to claim 1, wherein the network device further comprises multiple sensing channels and determining the operating variable involves determining one or more of the sensing channels to be used for receiving and/or transmitting signals, and/or wherein determining the operating variable involves determining a carrier frequency to be used for receiving and/or transmitting signals.

9. The network device according to claim 1, wherein the network information further includes information indicative of a sensing load on the radiofrequency sensing network, and the configuration module is adapted to determine the operating variable further based on the information indicative of the sensing load.

10. The network device according to claim 1, wherein the network information further includes information indicative of a sensing mode, a sensing need of the radiofrequency sensing network, a predetermined power consumption level of the network device, and/or a predetermined radiation tolerance, and wherein the configuration module is adapted to determine the operating variable further based on the information indicative of the sensing mode, the sensing need of the radiofrequency sensing network the predetermined power consumption level of the network device and/or the predetermined radiation tolerance.

11. The network device according to claim 1, wherein the network information further includes information indicative of a location of the network device, and the configuration module is adapted to determine the operating variable further based on the information indicative of the location of the network device.

12. A configuration method for configuring a network device of a radiofrequency sensing network, the configuration method comprising:

providing network information, the network information including information indicative of a deviation between a current sensitivity of the radiofrequency sensing network and a desired sensitivity of the radiofrequency sensing network, determining an operating variable of the network device based on a predetermined relation between the operating variable of the network device and the sensitivity of the radiofrequency sensing network and on the information indicative of the deviation between the current sensitivity of the radiofrequency sensing network and the desired sensitivity of the radiofrequency sensing network such that the deviation decreases when the network device is configured based on the determined operating variable, the operating variable of the network device referring to a parameter used for processing radiofrequency signals received by the network device or to a setting based on which the network device receives and/or transmits radiofrequency signals, and configuring the network device based on the determined operating variable;

wherein the network information further includes information indicative of a sensing result and a sensing need depending on the sensing result, and the determination of the operating variable is further based on the information indicative of the sensing result and the sensing need depending on the sensing result.

13. A non-transitory computer readable medium comprising computer program code to perform the method according to claim 12 when run on one or more processors.

* * * * *